US011512232B2

(12) United States Patent
Morioka et al.

(10) Patent No.: US 11,512,232 B2
(45) Date of Patent: Nov. 29, 2022

(54) PRESSURE-SENSITIVE ADHESIVE SHEET

(71) Applicant: NITTO DENKO CORPORATION, Ibaraki (JP)

(72) Inventors: Ryo Morioka, Ibaraki (JP); Masataka Nishiwaki, Ibaraki (JP); Toshiki Ikami, Ibaraki (JP); Yasushi Buzojima, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 58 days.

(21) Appl. No.: 16/656,985

(22) Filed: Oct. 18, 2019

(65) Prior Publication Data

US 2020/0123420 A1 Apr. 23, 2020

(30) Foreign Application Priority Data

Oct. 22, 2018 (JP) .............................. JP2018-198633

(51) Int. Cl.
C09J 7/38 (2018.01)
C09J 7/40 (2018.01)
C08K 3/04 (2006.01)
B32B 7/12 (2006.01)

(52) U.S. Cl.
CPC ................ C09J 7/385 (2018.01); B32B 7/12 (2013.01); C08K 3/04 (2013.01); B32B 2457/20 (2013.01); C08K 2201/005 (2013.01); C09J 2203/326 (2013.01)

(58) Field of Classification Search
None
See application file for complete search history.

(56) References Cited

U.S. PATENT DOCUMENTS

| 9,676,969 | B2* | 6/2017 | Nakako ................. H05K 3/105 |
| 2013/0245160 | A1 | 9/2013 | Shimada et al. |
| 2013/0344326 | A1 | 12/2013 | Yamashita et al. |
| 2014/0242362 | A1 | 8/2014 | Nakako et al. |
| 2016/0168426 | A1 | 6/2016 | Yamashita et al. |
| 2016/0230052 | A1* | 8/2016 | Wu ........................ C09J 133/06 |

FOREIGN PATENT DOCUMENTS

| CN | 103228753 A | 7/2013 |
| CN | 103509478 A | 1/2014 |
| CN | 105339168 A | 2/2016 |
| EP | 1 795 567 A2 | 6/2007 |
| EP | 2 105 483 A1 | 9/2009 |
| EP | 2 979 864 A1 | 2/2016 |
| JP | 2002-235053 A | 8/2002 |
| JP | 2003-213035 A | 7/2003 |
| JP | 2007-154078 A | 6/2007 |
| JP | 2013-32430 A | 2/2013 |
| JP | 2017-057375 A | 3/2017 |

OTHER PUBLICATIONS

Notice of Reasons for Refusal dated Jul. 21, 2022 from the Japanese Patent Office in Japanese Application No. 2018-198633.
First Office Action dated Aug. 23, 2022 from the Chinese Patent Office in Chinese Application No. 201911004648.5.

* cited by examiner

Primary Examiner — Cheng Yuan Huang
(74) Attorney, Agent, or Firm — Sughrue Mion, PLLC

(57) ABSTRACT

The invention provides a PSA sheet having a PSA layer exhibiting superior light shielding. Provided is a PSA sheet comprising a PSA layer that includes a PSA polymer. Carbon black particles are dispersed in the PSA layer. The average particle size of the carbon black particles dispersed in the PSA layer is 300 nm or smaller. The average particle size is an average particle size determined on the basis of a number-based particle size distribution by TEM observation.

20 Claims, 5 Drawing Sheets

PARTICLE SIZE DISTRIBUTION OF CARBON BLACK DISPERSION A IN PSA

PARTICLE SIZE DISTRIBUTION OF CARBON BLACK DISPERSION B IN PSA

PARTICLE SIZE DISTRIBUTION OF CARBON BLACK DISPERSION D IN PSA

PRESSURE-SENSITIVE ADHESIVE SHEET

CROSS-REFERENCE

The present application claims priority based on Japanese Patent Application No. 2018-198633, filed on Oct. 22, 2018, the entire contents whereof are incorporated in the present specification by reference.

BACKGROUND OF THE INVENTION

1. Field of the Invention

The present invention relates to a pressure-sensitive adhesive sheet.

2. Description of the Related Art

Generally, pressure sensitive adhesives (PSAs) exhibit a soft solid state (viscoelastic body) in a temperature region around room temperature, and have the property of adhering easily to an adherend by pressure. By drawing on such properties, PSAs are widely used for instance to bond, fix and protect members in mobile electronic devices such as mobile phones. For instance, a substrate-supported PSA sheet having a light-shielding PSA layer that contains a pigment is used, in mobile electronic devices such as mobile phones, for the purpose of for instance preventing reflection and preventing light leakage from a self-luminous element such as a light source or organic electroluminescence (EL), for example in a backlight module of a liquid crystal display device. Examples of literature pertaining to this kind of art include Japanese Patent Application Publication No. 2017-57375.

SUMMARY OF THE INVENTION

To meet the demand for thinner and lighter devices in the field of mobile electronic devices, also PSA sheets that are used in such applications should desirably be thinner. Recent years have witnessed a trend towards larger screens (display screens of greater surface area), and a greater emphasis on design, in mobile electronic devices; achieving narrower PSA sheets has thus come to be desirable for instance in order to offset the decrease in portability derived from larger screens, and to improve design versatility. Also, light-shielding PSA sheets used for such applications have tended to become thinner and narrower, but thinner and narrower light-shielding PSA sheets entail smaller light transmission distances, which results in lessened light shielding. When making a light-shielding PSA sheet thinner, therefore, light shielding is ensured by increasing the amount of a pigment, but generally pigments in PSAs can be a limiting factor of adhesive performance for instance in terms of adhesive strength and impact resistance. There is thus a demand for the production of a PSA that allows enhancing light shielding but without an increase in the amount of pigments that are used.

It is an object of the present invention, arrived at in view of the above considerations, to provide a PSA sheet having a PSA layer that exhibits superior light shielding.

In the present specification, there is provided a PSA sheet comprising a PSA layer that includes an adhesive polymer. The PSA layer includes carbon black particles in a dispersed state. The carbon black particles dispersed in the PSA layer have an average particle size of 300 nm or smaller. The average particle size is an average particle size determined based on a number-based particle size distribution by TEM observation.

The carbon black particles used as a black pigment are generally handled in the form of a dispersion in which the carbon black particles are dispersed in a dispersion medium such as an aqueous solvent or an organic solvent Once incorporated into the PSA layer, however, the dispersion medium constitutes now the PSA layer and exhibits a different dispersion state and a different particle size distribution than those when the medium is present in the dispersion. It is found that light shielding of the PSA layer depends on the dispersion state and particle size distribution of the carbon black particles within the PSA layer; accordingly, accurately evaluating the dispersion state and particle size distribution of the carbon black particles is therefore important in terms of achieving an ideal light-shielding performance. On the basis of this idea, the inventors rely on transmission electron microscopy (TEM) as a method for evaluating carbon black particles in the PSA layer. In this method, a PSA sample is instantly frozen, and can then be observed under a TEM in substantially the same state as at normal temperature. Using this method, the inventors addressed the influence that the particle size distribution of the carbon black particles dispersed in the PSA layer exerted on light shielding, and found as a result that superior light shielding is achieved when the average particle size of the carbon black particles dispersed in the PSA layer is equal to or smaller than a predetermined value. The present invention was perfected on the basis of that finding. Specifically, a PSA sheet in which the average particle size of carbon black particles dispersed in a PSA layer is 300 nm or less exhibits superior light shielding.

In a preferred embodiment of the PSA sheet disclosed herein, the carbon black particles dispersed in the PSA layer have a standard deviation smaller than 200 nm in the number-based particle size distribution by TEM observation. The above feature wherein the standard deviation is small implies that the particle size distribution is narrow. A small standard deviation signifies that, on the large size side, the number of large particles having a relatively small specific surface area is limited, and a given amount of carbon black particles has a predetermined or greater light absorption area. A small standard deviation further signifies that, on the small size side, the number of small particles that give rise to diffraction and/or scattering, and which contribute little to the light absorption, is limited. Specifically, superior light absorption i.e. superior light shielding can be preferably realized in an embodiment where the above standard deviation is smaller than 200 nm.

In a preferred embodiment of the PSA sheet disclosed herein, the carbon black particles dispersed in the PSA layer have a particle size of 350 nm or more in an amount lower than 10%, in the number-based particle size distribution by TEM observation. Carbon black particles in which the proportion of large particles having a particle size of 350 nm or more and being of small specific surface area is lower than 10% exhibit superior light absorption, and can bring out yet superior light shielding.

In a preferred embodiment of the PSA sheet disclosed herein, the carbon black particles dispersed in the PSA layer have a particle size of 100 nm or more and less than 150 nm in an amount of 15% or more in the number-based particle size distribution by TEM observation. The results in the examples described further on suggest that particles having a particle size of 100 nm or more and less than 150 nm in the PSA layer make the greatest contribution to light absorption (in other words to light shielding). A particularly superior light-shielding effect can be elicited by setting the number of particles within this particle size range to be 15% or more of the whole.

In a preferred embodiment of the PSA sheet disclosed herein, the PSA layer includes the carbon black particles in an amount of 0.1 to 30% by weight. Desired light shielding can be preferably brought out by setting the content of the carbon black particles to 0.1 wt % or more. A drop in adhesive characteristics such as adhesive strength can be preferably suppressed by setting the above content to 30 wt % or less.

In a preferred embodiment of the PSA sheet disclosed herein, the adhesive polymer is an acrylic polymer. The effect of the art disclosed herein is preferably brought out in a PSA layer containing an acrylic polymer.

In a preferred embodiment of the PSA sheet disclosed herein, the PSA layer has a thickness of 1 to 100 μm. Superior light shielding and desired adhesive characteristics can be preferably brought out by setting the thickness of the PSA layer to 1 μm or more. The demand for a thinner and lighter PSA sheet can be met satisfactorily by setting the thickness of the PSA layer to 100 μm or less.

The PSA sheet in a preferred embodiment consists of the PSA layer, which can be referred to as a PSA sheet without substrate, or a PSA sheet which does not have any substrate, support layer, or backing layer. Such a PSA sheet may be in the form of a PSA sheet with release liner, which can be referred to as a PSA transfer sheet, or a PSA sheet with release liner without substrate. The double-sided PSA sheet without substrate can be made thinner to the extent that the substrate is absent, and can contribute to reducing the size of, and saving space in, the article in which the double-sided PSA sheet is to be used. A PSA sheet can maximally bring out the effect of the PSA layer, for instance in terms of adhesive strength and impact resistance. The PSA sheet in another preferred embodiment is a PSA sheet with substrate, having a substrate that supports the PSA layer. Processability and ease of handling of the PSA sheet are improved, which allows the PSA sheet to be preferably used in various applications, through the use of a support substrate. By being provided with a support substrate, for instance a narrower PSA sheet can be produced as a result with good dimensional precision.

The PSA sheet disclosed herein can be preferably used for instance in order to bond a member of a mobile electronic device. As described above, preventing leakage of light is a requirement in mobile electronic devices having a light source. A further requirement in mobile electronic devices having a display screen is to ensure for instance visibility of the display screen, by preventing for example reflection from inside the device and reflection of incident light from outside, such as sunlight. Accordingly, resorting to the art disclosed herein is particularly significant in terms of preventing light leakage and ensuring the visibility of a display screen.

DETAILED DESCRIPTION OF THE INVENTION

Figure 1:
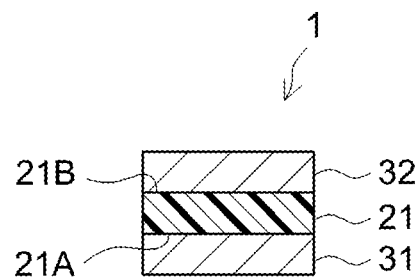
FIG. 1 is a cross-sectional diagram illustrating schematically a structural example of a PSA sheet.

Preferred embodiments of the present invention will be explained below. Any features other than the features specifically set forth in the present description and which may be necessary for carrying out the present invention can be regarded as instances of design matter for a person skilled in the art on the basis of known techniques in the technical field in question. The present invention can be realized on the basis of the disclosure of the present specification and common technical knowledge in the relevant technical field. In the drawings below, members and portions eliciting identical effects are denoted by identical reference symbols, and a recurrent explanation thereof may be omitted or simplified. The embodiments described in the drawings are schematized for the sake of a clearer explanation of the present invention, and do not necessarily represent accurately the size or scale of the PSA sheet of the present invention that is actually provided as a product.

As used in the present specification, the term "PSA" refers to a material exhibiting a soft solid state (viscoelastic body) in a temperature region around room temperature, as described above, the material having the property of adhering easily to an adherend by pressure. As defined in "Adhesion: Fundamentals and Practice" by C. A. Dahlquist (McLaren & Sons (1966), P. 143), the PSA as referred to herein may ordinarily be a material that having the property of satisfying a complex tensile modulus $E^*(1\ Hz) < 10^7$ dyne/cm$^2$ (typically, a material that exhibits the above characteristic at 25° C.).

Configuration Example of PSA Sheet

The PSA sheet disclosed herein may be a PSA sheet with substrate, of a form having the PSA layer on one side or each side of a non-releasable substrate (support substrate), of may be a PSA sheet without substrate for instance of a form where the PSA layer is held on a release liner (i.e. in the form of a PSA sheet not having a non-releasable substrate). The PSA sheet as referred to herein can encompass conceptually so-called PSA tapes, PSA labels and PSA films. The PSA sheet disclosed herein may be in roll form or in flat sheet form. Alternatively, the PSA sheet may be further worked into various shapes.

Figure 2:
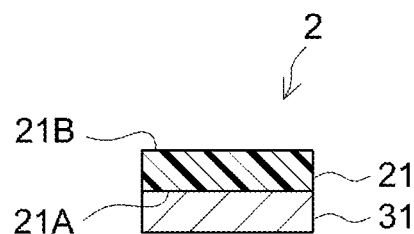
FIG. 2 is a cross-sectional diagram illustrating schematically another structural example of a PSA sheet.

FIG. 1 and FIG. 2 illustrate structural examples of a PSA sheet without substrate of double-sided (double-faced, two-sided, etc.) PSA type (double-sided PSA sheet without substrate, PSA sheet that is adhesive on both sides). The PSA sheet 1 illustrated in FIG. 1 has a structure wherein each side 21A, 21B of a PSA layer 21 of a form without substrate is protected by respective release liners 31, 32, each having a release surface at least on the PSA layer side. The PSA sheet 2 illustrated in FIG. 2 has a structure wherein one surface (PSA surface) 21A of the PSA layer 21 of a form without substrate is protected by a release liner 31 having a release surface on each side. When the PSA sheet is wound, the other surface (PSA surface) 21B of the PSA layer 21 is brought into contact with the back surface of the release liner 31, as a result of which also the other surface 21B becomes protected by the release liner 31. The art disclosed herein can be preferably implemented in such a form without substrate, from the viewpoint of reducing the thickness of the PSA sheet. A PSA sheet without substrate is advantageous herein in that the sheet can be made readily thinner and PSA characteristics such as adhesive strength and impact resistance can be maximally brought out. Alternatively, the PSA sheet disclosed herein may be in the form of a substrate-backed double-sided PSA sheet, not particularly illustrated in the figures, having a PSA layer on each side of a non-releasable substrate (support substrate).

PSA Layer

Particle Size Characteristic of Carbon Black Particles in PSA Layer

The PSA layer disclosed herein contains an adhesive polymer, with carbon black particles being dispersed in the PSA layer. The average particle size of the carbon black particles dispersed in the PSA layer is 300 nm or less. The term average particle size of the carbon black particles dispersed in the PSA layer denotes an average particle size determined based on a number-based particle size distribution by TEM observation. Specifically, the average particle size is measured using frozen ultrathin sections of the PSA. The feature wherein the average particle size of the carbon black particles in the PSA layer is 300 nm or less signifies that the number of large particles having a relatively small specific surface area is limited, and that a given quantity of carbon black particles in the PSA layer has a predetermined or larger light absorption area. As a result, the PSA layer has superior light shielding. The average particle size is preferably about 250 nm or less, more preferably about 200 nm or less and yet more preferably about 150 nm or less. The lower limit of the average particle size is not particularly restricted, and is appropriately about 10 nm or more. From the viewpoint of limiting the number of small particles having low light absorption and which cause diffraction and/or scattering, the lower limit of the average particle size is preferably about 50 nm or more, more preferably about 70 nm or more, yet more preferably about 100 nm or more (for instance about 110 nm or more).

The carbon black particles dispersed in the PSA layer disclosed herein have preferably a standard deviation smaller than 200 nm in the above number-based particle size distribution by TEM observation. As a result, the proportion of particles in a particle size range within which excellent light absorption is elicited becomes equal to or higher than a predetermined proportion, and superior light shielding is preferably is brought out. More preferably, the standard deviation is smaller than 150 nm, yet more preferably smaller than 100 nm, and particularly preferably smaller than 80 nm (for instance smaller than 50 nm). The lower limit of the standard deviation is not particularly restricted, and is appropriately about 10 nm or more, for instance about 20 nm or more (typically about 30 nm or more).

In the carbon black particles dispersed in the PSA layer disclosed herein the proportion of particles having a particle size of 350 nm or more is appropriately about 30% or less. Superior light shielding is readily obtained by limiting the proportion of large particles having a particle size of 350 nm or more and being of small specific surface area. In the above particle size distribution, the proportion of particles having a particle size of 350 nm or more is preferably about 15% or less, more preferably lower than 10%, yet more preferably lower than 5%, and particularly preferably lower than 1% (being typically substantially 0%).

In a preferred embodiment, the proportion of particles having a particle size of 200 nm or more among the carbon black particles dispersed in the PSA layer is about 50% or less, in the number-based particle size distribution by TEM observation. Yet better light shielding tends to be obtained through limiting of the proportion of particles having a particle size of 200 nm or more. The proportion of particles having a particle size of 200 nm or more in the particle size distribution is preferably about 30% or less, more preferably about 15% or less. For instance in terms of the difficulty of fully controlling the particle size distribution, the lower limit of the proportion of particles having a particle size of 200 nm or more in the particle size distribution may be about 1% or more, and for instance about 5% or more (or 10% or more) in the number-based particle size distribution by TEM observation.

In the carbon black particles dispersed in the PSA layer disclosed herein, the proportion of particles having a particle size of 100 nm or more and less than 150 nm is appropriately about 12% or more in the number-based particle size distribution by TEM observation. A particularly superior light-shielding effect can be elicited by causing particles having a particle size of 100 nm or more and less than 150 nm, deemed to be superior in light absorption, to be present in the PSA layer in a predetermined or greater amount. In the particle size distribution, the proportion of particles having a particle size of 100 nm or more and less than 150 nm is preferably about 15% or more, more preferably about 20% or more, yet more preferably about 25% or more (for instance 28% or more). For instance, in terms of the difficulty of fully controlling the particle size distribution, the proportion of particles having a particle size of 100 nm or more and less than 150 nm in the above particle size distribution may be about 80% or less, and may be for instance 50% or less (further, about 35% or less).

Although not particularly limited thereto, in the carbon black particles dispersed in the PSA layer there is preferably restricted the proportion of particles having a particle size smaller than 100 nm in the number-based particle size distribution by TEM observation. That is because particles having a particle size smaller than 100 nm are small particles lacking good light absorption and which give rise to diffraction and/or scattering. From the above viewpoint, the proportion of particles having a particle size smaller than 100 nm in the particle size distribution is preferably about 80% or less, more preferably about 60% or less, yet more preferably about 50% or less (for instance about 45% or less). For instance, in terms of the difficulty of fully controlling the particle size distribution, the proportion of particles having a particle size smaller than 100 nm in the particle size distribution may be about 10% or more, for instance 20% or more (or about 30% or more).

The average particle size, standard deviation and other particle size distribution characteristics determined based on the number-based particle size distribution by TEM observation can be achieved through selection of the species of the carbon black particles, selection of the PSA composition (mainly for instance the monomer composition of a base polymer, and the species and amount of crosslinking agent), selection of the species and amount of dispersant suitable for the carbon black particles and for a PSA, and on the basis of the dispersion conditions of the carbon black particles in the PSA. For instance, there can be prepared a plurality of species of PSAs by combining different carbon black particles, dispersants and PSA components, with screening by TEM observation (this operation may be repeated if necessary), to yield a carbon black particle-including PSA having a desired particle size distribution characteristic. The species of carbon black particles and the species of dispersant can be selected on the basis of the disclosure of the present specification and on the basis of common technical knowledge, in accordance with the mechanical and chemical characteristics of the PSA that contains the carbon black particles and the dispersant. The average particle size, standard deviation and other particle size characteristics determined based on the number-based particle size distribution by TEM observation are specifically measured in accordance with the methods set out in the examples described below.

Carbon Black Particles

The carbon black particles included in the PSA layer disclosed herein are not particularly limited, so long the carbon black particles can satisfy an average particle size equal to or smaller than a predetermined value, within the PSA layer. Particles generally referred to as carbon black (for instance, furnace black, channel black, acetylene black, thermal black, lamp black and pine smoke) can be used, without particular limitations, as the carbon black particles that are utilized herein. Surface-modified carbon black particles having a carboxyl group, amino group, sulfonic acid group, silicon-containing group (for instance an alkoxysilyl group or an alkylsilyl group) can be used as the carbon black particles. Such surface-modified carbon black particles, which are also referred to as self-dispersing carbon black, do not require addition of a dispersant, or alternatively the addition amount of the dispersant can be reduced. The carbon black particles can be used singly or in combinations of two or more species. Self-dispersing carbon black can be produced on the basis of the methods described in for instance Japanese Patent Application Publication Nos. 2017-171732 and 2018-30968, and on the basis of common technical knowledge by a person skilled in the art; alternatively, a suitable self-dispersing carbon black can be selected from among commercial products.

As pointed out above, the particle size characteristic based on the dispersion state of the carbon black particles within the PSA layer is important in the art disclosed herein. The particle size characteristic of the carbon black particles prior to addition to the PSA layer is not particularly limited. From the viewpoint of preferably eliciting the effect (light shielding) of the art disclosed herein, the volume average particle size of the carbon black particles is ordinarily about 10 nm or more, for instance about 100 nm or more, and further about 150 nm or more, and is appropriately set to for instance about 500 nm or less, or about 300 nm or less. The standard deviation of the particle size distribution of the carbon black particles is not particularly limited, and ordinarily is appropriately set to about 200 nm or less, further, about 150 nm or less (for instance about 100 nm or less); and may be about 10 nm or more (for instance about 30 nm or more). The volume average particle size and standard deviation of the carbon black particles prior to addition to the PSA layer can be measured on the basis of a laser scattering/diffraction method. Specifically, the volume average particle size and standard deviation can be measured in accordance with the methods described in the examples below.

The content of the carbon black particles is not particularly limited and can be properly set taking into consideration for instance the PSA layer thickness, the light shielding to be achieved, and the required adhesive characteristics. The content of the carbon black particles in the PSA layer is appropriately about 0.1 wt % or more, and from the viewpoint of light shielding, is preferably about 0.5 wt % or more, more preferably about 1 wt % or more (for instance about 3 wt % or more, and further 5 wt % or more). The content of the carbon black particles can be set to about 80 wt % or less, and is appropriately about 50 wt % or less. For instance, from the viewpoint of adhesive characteristics, the content of the carbon black particles is preferably about 30 wt % or less, more preferably about 20 wt % or less, yet more preferably about 10 wt % or less (for instance 7 wt % or less). In a case where adhesive characteristics such as adhesive strength are to be emphasized, the content of the carbon black particles is preferably about 5 wt % or less, more preferably about 3 wt % or less, yet more preferably about 2 wt % or less (for instance lower than 2 wt %), and may be for instance about 1 wt % or less. The art disclosed herein affords superior light shielding on the basis of the dispersion state of the carbon black particles, and hence light shielding comparable to or superior to a conventional one can be realized through addition of a relatively small amount of carbon black particles.

Light shielding in the thickness direction depends on the thickness of the PSA layer that includes the carbon black particles, and accordingly the content of carbon black particles that are used preferably differs depending on the thickness of the PSA layer. For instance in an embodiment with a PSA layer having a thickness of 15 μm or less, the content of the carbon black particles in the PSA layer can be set to about 1 wt % or more, preferably about 3 wt % or more, more preferably about 7 wt % or more (for instance about 9 wt % or more), and can be set to about 80 wt % or less, being appropriately about 50 wt % or less, preferably about 30 wt % or less, more preferably about 20 wt % or less (for instance about 15 wt % or less). In this embodiment, the lower limit of the thickness of the PSA layer is not particularly restricted, and the PSA layer has for instance a thickness of 1 μm or more.

In an embodiment with a PSA layer having a thickness of 25 μm or less, the content of the carbon black particles in the PSA layer can be set to about 0.5 wt % or more, and is preferably about 1 wt % or more, more preferably about 3 wt % or more (for instance about 5 wt % or more). The content can be set to about 50 wt % or less, and is appropriately about 30 wt % or less, preferably about 20 wt % or less, and more preferably about 10 wt % or less (for instance about 7 wt % or less). In this embodiment, the thickness of the PSA layer is for instance larger than 15 μm.

In an embodiment with a PSA layer having a thickness of 35 μm or less, the content of the carbon black particles in the PSA layer can be set to about 0.3 wt % or more, preferably about 0.5 wt % or more, more preferably about 1 wt % or more (for instance about 3 wt % or more). The content can be set to about 30 wt % or less, and is appropriately about 20 wt % or less, preferably about 10 wt % or less, more preferably about 5 wt % or less (for instance about 3 wt % or less). In this embodiment, the thickness of the PSA layer is for instance larger than 25 μm.

In an embodiment having a PSA layer having a thickness larger than 35 μm, the content of the carbon black particles in the PSA layer can be set to about 0.1 wt % or more, preferably about 0.3 wt % or more, more preferably about 0.5 wt % or more (for instance about 1 wt % or more). The content can be set to about 20 wt % or less, and is appropriately about 10 wt % or less, preferably about 5 wt % or less, more preferably about 3 wt % or less (for instance about 1 wt % or less).

The content of the carbon black particles is basically synonymous herein with the formulation amount thereof, and can be quantified on the basis of a thermo gravity-differential thermal analysis (TG-DTA) described in the examples below.

Dispersant

The PSA layer disclosed herein may or may not include a dispersant. In a case for instance where the above-described self-dispersing carbon black is utilized, the use of a dispersant can be omitted. As the dispersant there is used a dispersant capable of dispersing well carbon black particles in the PSA layer that includes the adhesive polymer. For instance, one or two or more dispersants exhibiting good characteristics can be selected and used, from among anionic, cationic, nonionic and amphoteric surfactants, and polymer compounds (which may be resins) can be used herein. Both oily (typically oil-soluble) and aqueous (typically water-soluble) compounds can be used as the polymer compound.

Examples of anionic surfactants used as dispersants include alkyl sulfates such as lauryl sulfates and octadecyl sulfates; fatty acid salts; polysulfonates; polycarboxylates; alkylbenzene sulfonates such as nonylbenzene sulfonates and dodecylbenzene sulfonates; naphthalene sulfonates such as dodecyl naphthalene sulfonates; naphthalene sulfonic acid formaldehyde condensate; alkyl diphenyl ether disulfonates such as dodecyl diphenyl ether disulfonates; polyoxyethylene alkyl ether sulfates such as polyoxyethylene octadecyl ether sulfates and polyoxyethylene lauryl ether sulfates; polyoxyethylene alkylphenyl ether sulfates such as polyoxyethylene lauryl phenyl ether sulfates; polyoxyethylene styrenated phenyl ether sulfates; sulfosuccinates such as lauryl sulfosuccinates and polyoxyethylene lauryl sulfosuccinates; polyoxyethylene alkyl ether phosphates; polyoxyethylene alkyl phosphates/sulfonates; polyoxyethylene alkyl ether acetates and the like. When the anionic surfactant forms a salt, the salt may be for instance a metal salt (preferably a monovalent metal salt) such as a sodium salt, a potassium salt, a calcium salt or a magnesium salt, and may be an ammonium salt or an amine salt. These anionic surfactants can be used singly or in combinations of two or more species.

Examples of cationic surfactants used as the dispersant include alkylamine salts and quaternary ammonium salts. Concrete examples thereof include stearylamine acetate, coconut trimethyl ammonium chloride, tallow trimethyl ammonium chloride, dimethyldioleyl ammonium chloride, methyl oleyl diethanol chloride, tetramethylammonium chloride, laurylpyridinium chloride, laurylpyridinium bromide, laurylpyridinium disulfate, cetylpyridinium bromide, 4-alkyl mercaptopyridines, poly(vinylpyridine)-dodecyl bromide and dodecylbenzyltriethylammonium chloride. These cationic surfactants can be used singly or in combinations of two or more species.

Examples of nonionic surfactant used as dispersants include polyoxyethylene alkyl ethers such as polyoxyethylene lauryl ether, polyoxyethylene cetyl ether, polyoxyethylene stearyl ether and polyoxyethylene oleyl ether; polyoxyethylene alkyl phenyl ethers such as polyoxyethylene octyl phenyl ether and polyoxyethylene nonylphenyl ether; sorbitan fatty acid esters such as sorbitan monolaurate, sorbitan monopalmitate, sorbitan monostearate and sorbitan monooleate; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan triisostearate, polyoxyethylene sorbitan monooleate and polyoxyethylene sorbitan trioleate; polyoxyethylene glyceryl ether fatty acid esters; and polyoxyelene-polyoxypropylene block copolymers. These nonionic surfactants can be used singly or in combinations of two or more species.

Examples of amphoteric surfactants used as dispersants include alkylbetaines such as alkyldimethyl aminoacetic acid betaines; aminocarboxylates; and alkylimidazolines. These amphoteric surfactants can be used singly or in combinations of two or more species.

Examples of resins (which may be polymer compounds) that can be used as the dispersant include polyurethane resins; polyester resins; polyamide resins such as unsaturated polyamides; (meth)acrylic resins such as poly(meth)acrylic acid esters and (meth)acrylic acid-(meth)acrylate copolymers; polycarboxylic acid (salts) such as amine salts, ammonium salts and alkylamine salts of polyacrylic acid and polycarboxylic acids; styrenic copolymers such as (meth)acrylic acid-styrene copolymers and styrene-maleic acid copolymers polyvinyl alcohol; polyvinylpyrrolidone; polysiloxanes; polyalkylene oxide derivatives such as ethylene oxide-propylene oxide addition compounds; phosphate ester resins; and long-chain polyaminoamide phosphates, and modified products of the foregoing. These resins can be used singly or in combinations of two or more species.

The manner in which the dispersant is added is not particularly limited, and may involve incorporating the dispersant into a carbon black particle-including liquid prior to addition to the PSA composition; alternatively, the dispersant may be supplied to the PSA composition simultaneously with the carbon black particles, or before or after addition of the carbon black particles.

The content of the dispersant in the PSA layer disclosed herein is set properly so that the carbon black particles within the layer exhibit a desired dispersion state, and hence is not limited to a specific range. The amount of dispersant relative to 100 parts by weight of the carbon black particles in the PSA layer can be set to about 0.01 parts by weight or more (for instance about 0.1 parts by weight or more), and from the viewpoint of increasing the dispersibility of the carbon black particles, is appropriately set to about 1 part by weight or more, and may be for instance about 2 parts by weight or more, for instance about 3 parts by weight or more, and about 5 parts by weight or more. The upper limit of the dispersant content can be set to about 50 parts by weight or less relative to 100 parts by weight of the carbon black particles in the PSA layer, and from the viewpoint of maintaining good adhesive characteristics, and in terms of PSA layer formability, can be appropriately set to about 30 parts by weight or less, and may be about 20 parts by weight or less, or about 10 parts by weight or less.

PSA Polymer

In the art disclosed herein the species of the PSA that makes up the PSA layer is not particularly limited. The PSA can include, as a PSA polymer (hereafter also referred to as "base polymer", in the sense of being a structural polymer that forms the PSA), one or two or more species of rubbery polymers such as acrylic polymers, rubber polymers (natural rubbers, synthetic rubbers and mixtures of the foregoing), polyester polymers, urethane polymers, polyether polymers, silicone polymers, polyamide polymers, and fluoropolymers, that are used in the field of PSAs. For instance, from the viewpoint of adhesive performance and cost, there can be preferably used a PSA that includes an acrylic polymer or rubber-based polymer as a base polymer. Preferred among the foregoing is a PSA (acrylic PSA) having an acrylic polymer as the base polymer. An explanation follows below concerning mainly a PSA sheet having a PSA layer made up of an acrylic PSA, i.e. an acrylic PSA layer, but the explanation is not meant to limit the PSA layer of the PSA sheet disclosed herein to a PSA layer made up of an acrylic PSA.

The term "base polymer" of the PSA denotes herein the main component of a rubbery polymer included in the PSA. The term rubbery polymer refers to a polymer exhibiting rubber elasticity in a temperature region close to room temperature. Unless otherwise stated, in the present description the term "main component" denotes a component the content of which exceeds 50 wt %.

The term "acrylic polymer" refers to a polymer that includes, as monomer units that make up the polymer, monomer units derived from a monomer having at least one (meth)acryloyl group in the molecule. A monomer having at least one (meth)acryloyl group in the molecule will also be referred to hereafter as "acrylic monomer". Therefore, the acrylic polymer in the present description is defined as a polymer that includes monomer units derived from an acrylic monomer. Typical examples of acrylic polymers include acrylic polymers in which the proportion of acrylic monomer in the totality of monomer components used for synthesizing the acrylic polymer is higher than 50 wt %.

The term "(meth)acryloyl" denotes acryloyl and methacryloyl comprehensively. Similarly, the term "(meth)acrylate" denotes acrylate and methacrylate comprehensively, and the term "(meth)acrylic" denotes acrylic and methacrylic comprehensively.

Acrylic Polymer

The acrylic polymer in the art disclosed herein is preferably for instance a polymer of a monomer starting material that includes an alkyl (meth)acrylate as a monomer, and can further include a secondary monomer that is copolymerizable with the main monomer. The term main monomer denotes a component that is present in more than 50 wt % of the monomer composition of the monomer starting material.

A compound represented by Formula (1) below can be suitably used as the alkyl (meth)acrylate.

$$CH_2=C(R^1)COOR^2 \quad (1)$$

In Formula (1), $R^1$ represents a hydrogen atom or a methyl group. Further, $R^2$ is a chain alkyl group having 1 to 20 carbon atoms. Such a range of number of carbon atoms may be notated hereafter as "$C_{1-20}$". For instance, from the viewpoint of the storage elastic modulus of the PSA, the main monomer is appropriately herein an alkyl (meth)acrylate where $R^2$ is a $C_{1-14}$ (for instance $C_{1-10}$, typically $C_{4-8}$) chain alkyl group. From the viewpoint of adhesive characteristics, the main monomer is preferably an alkyl acrylate where $R^1$ is a hydrogen atom and $R^2$ is a $C_{4-8}$ chain alkyl group (hereafter also referred to simply as $C_{4-8}$ alkyl acrylate).

Concrete examples of the alkyl (meth)acrylate in which $R^2$ is a $C_{1-20}$ chain alkyl group are not particularly limited, and may include for instance methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate. These alkyl (meth)acrylates can be used singly or in combinations of two or more species. Preferred examples of the alkyl (meth)acrylate include n-butyl acrylate (BA) and 2-ethylhexyl acrylate (2EHA).

The proportion of the alkyl (meth)acrylate in the monomer components that make up the acrylic polymer is typically higher than 50 wt %, and for instance can be set to 70 wt % or more, or to 85 wt % or more, or to 90 wt % or more. The upper limit of the proportion of the alkyl (meth)acrylate is not particularly restricted, and ordinarily is preferably set to 99.5 wt % or less (for instance 99 wt % or less); alternatively, the upper limit may be set to 98 wt % or less (for instance less than 97 wt %) from the viewpoint of preferably bringing out a characteristic (for instance cohesive strength) based on the secondary monomer such as a carboxy group-containing monomer. Alternatively, the acrylic polymer may be obtained through polymerization of substantially an alkyl (meth)acrylate alone.

In a case where a $C_{4-8}$ alkyl acrylate is used as a monomer component, the proportion of the $C_{4-8}$ alkyl acrylate in the alkyl (meth)acrylates included in the monomer components is preferably 70 wt % or more, and more preferably 90 wt % or more. The art disclosed herein can be preferably implemented in an embodiment in which 50 wt % or more (typically 60 wt % or more) of the totality of monomer components is BA. In a preferred embodiment, the proportion of BA in the totality of monomer components may be 70 wt % or more, or 80 wt % or more, and further 90 wt % or more. The totality of monomer components may further include 2EHA, in a proportion lower than that of BA.

The art disclosed herein can be preferably implemented in an embodiment in which the monomer components include 50 wt % or more of a $C_{1-4}$ alkyl (meth)acrylate. The proportion of the $C_{1-4}$ alkyl (meth)acrylate in the monomer components may be set to 70 wt % or more, or 85 wt % or more (for instance 90 wt % or more). From the viewpoint of achieving good cohesive strength, ordinarily the proportion of the $C_{1-4}$ alkyl (meth)acrylate in the monomer components is appropriately set to 99.5 wt % or less, and may be set to 98 wt % or less (for instance less than 97 wt %).

The art disclosed herein can be preferably implemented in an embodiment in which the monomer components include 50 wt % or more (for instance 70 wt % or more, or 85 wt % or more, or 90 wt % or more) of a $C_{2-4}$ alkyl acrylate. Concrete examples of the $C_{2-4}$ alkyl acrylate include ethyl acrylate, propyl acrylate, isopropyl acrylate, n-butyl acrylate (BA), isobutyl acrylate, s-butyl acrylate and t-butyl acrylate. The $C_{2-4}$ alkyl acrylate can be used singly or in combinations of two or more species. A PSA sheet that exhibits good tight adhesiveness to an adherend can be readily achieved in such an embodiment. In a preferred embodiment among the foregoing, for instance, the monomer components include more than 50 wt % (for instance 70 wt % or more, or 85 wt % or more, or 90 wt % or more) of BA. From the viewpoint of achieving good cohesive strength, ordinarily the proportion of the $C_{2-4}$ alkyl acrylate in the monomer components is appropriately set to 99.5 wt % or less, and may be set to 98 wt % or less (for instance less than 97 wt %).

In another embodiment, an embodiment can be adopted wherein the monomer components include 50 wt % or more (for instance 70 wt % or more, or 85 wt % or more, or 90 wt % or more) of a $C_{5-20}$ alkyl (meth)acrylate. The $C_{5-20}$ alkyl (meth)acrylate is preferably a $C_{6-14}$ alkyl (meth)acrylate. In one embodiment there can be preferably used a $C_{6-10}$ alkyl acrylate (for instance $C_{8-10}$ alkyl acrylate).

A secondary monomer may be copolymerized in the acrylic polymer of the art disclosed herein. Examples of secondary monomers that can introduce functional groups capable of constituting cross-linking points in the acrylic polymer, or that contribute to increasing adhesive strength, include carboxy group-containing monomers, hydroxyl group (OH group)-containing monomers, acid anhydride group-containing monomers, amide group-containing monomers, amino group-containing monomers, epoxy group-containing monomers, cyano group-containing monomers, keto group-containing monomers, monomers having a nitrogen atom-containing ring, alkoxysilyl group-containing monomers and imide group-containing monomers. The secondary monomer can be used singly or in combinations of two or more species.

Preferred examples of the acrylic polymer in the art disclosed herein include acrylic polymers in which a carboxy group-containing monomer is copolymerized as the above secondary monomer. Examples of carboxy group-containing monomers include acrylic acid (AA), methacrylic acid (MAA), carboxyethyl (meth)acrylate, carboxypentyl (meth)acrylate, itaconic acid, maleic acid, fumaric acid, crotonic acid and isocrotonic acid. Preferred among the foregoing are AA and MAA.

Another preferred example is an acrylic polymer in which a hydroxyl group-containing monomer is copolymerized as the secondary monomer. Examples of hydroxyl group-containing monomers include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate; polypropylene glycol mono(meth)acrylate; N-hydroxyethyl (meth)acrylamide and the like. Preferred hydroxyl group-containing monomers among the foregoing include hydroxyalkyl (meth)acrylates in which the alkyl group is a linear alkyl group having 2 to 4 carbon atoms.

Examples of amide group-containing monomers include (meth)acrylamide, N,N-dimethyl (meth)acrylamide, N-butyl (meth)acrylamide, N-methylol (meth)acrylamide, N-methylolpropane (meth)acrylamide, N-methoxymethyl (meth)acrylamide and N-butoxymethyl (meth)acrylamide.

Examples of amino group-containing monomers include aminoethyl (meth)acrylate, N,N-dimethylaminoethyl (meth) acrylate and t-butylaminoethyl (meth)acrylate.

Examples of monomers having an epoxy group include glycidyl (meth)acrylate, methylglycidyl (meth)acrylate and allyl glycidyl ether.

Examples of cyano group-containing monomers include acrylonitrile and methacrylonitrile.

Examples of the keto group-containing monomers include diacetone (meth)acrylamide, diacetone (meth)acrylate, vinyl methyl ketone, vinyl ethyl ketone, allyl acetoacetate and vinyl acetoacetate.

Examples of monomers having a nitrogen atom-containing ring include N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam and N-(meth)acryloylmorpholine.

Examples of alkoxysilyl group-containing monomers include 3-(meth)acryloxypropyl trimethoxysilane, 3-(meth) acryloxypropyltriethoxysilane, 3-(meth)acryloxypropylmethyldimethoxysilane and 3-(meth)acryloxypropylmethyldiethoxysilane.

In a case where the monomer components that make up the acrylic polymer contain the above-described functional group-containing monomer, the content of the functional group-containing monomer in the monomer components is not particularly limited. From the viewpoint of properly eliciting the effect derived from using the functional group-containing monomer, the content of the functional group-containing monomer in the monomer components can be for instance set to 0.1 wt % or more, and ordinarily may be appropriately set to 0.5 wt % or more, or 1 wt % or more. From the viewpoint of readily balancing adhesive performance with that of main monomer, ordinarily the content of the functional group-containing monomer in the monomer components is appropriately set to 40 wt % or less, and may be preferably set to 20 wt % or less, or to 10 wt % or less (for instance 5 wt % or less).

The base polymer according to a preferred embodiment may be a polymer in which the monomer components that make up the base polymer (for instance an acrylic polymer) include a carboxy group-containing monomer. By virtue of the fact that the monomer components include a carboxy group-containing monomer, a PSA sheet is readily obtained that exhibits good adhesive characteristics (for instance cohesive strength). This can be advantageous in terms of improving tight adhesiveness between the PSA layer and the adherend.

In embodiments where a carboxy group-containing monomer is copolymerized in the base polymer, the content of the carboxy group-containing monomer in the monomer components that make up the base polymer is not particularly limited, and for instance can be set to 0.2 wt % or more (typically 0.5 wt % or more) of the monomer components, and ordinarily may be appropriately set to 1 wt % or more, or 2 wt % or more, or 3 wt % or more. A more pronounced effect is elicited when the content of the carboxy group-containing monomer is set to be higher than 3 wt %. In one embodiment, the content of the carboxy group-containing monomer can be set to 3.2 wt % or more of the monomer components, or to 3.5 wt % or more, or 4 wt % or more, or 4.5 wt % or more. The upper limit of the content of the carboxy group-containing monomer is not particularly restricted, and for instance can be set to 15 wt % or less, and may be set to 12 wt % or less, or 10 wt % or less. The art disclosed herein can be preferably implemented also in an embodiment in which the content of the carboxy group-containing monomer is 7 wt % or less (typically less than 7 wt %, for instance 6.8 wt % or less, or 6.0 wt % or less).

The monomer components that make up the acrylic polymer may include other copolymerization components, different from the secondary monomer described above, for instance for the purpose of improving cohesive strength. Examples of other copolymerizable components include vinyl ester monomers such as vinyl acetate, vinyl propionate and vinyl laurate; aromatic vinyl compounds such as styrene, substituted styrene (α-methylstyrene and the like) and vinyl toluene; cycloalkyl (meth)acrylates such as cyclohexyl (meth)acrylate, cyclopentyl (meth)acrylate and isobornyl (meth)acrylate; aromatic ring-containing (meth)acrylates such as aryl (meth)acrylates (for example phenyl (meth) acrylate), aryloxyalkyl (meth)acrylates (for example phenoxyethyl (meth)acrylate) and arylalkyl (meth)acrylates (for example benzyl (meth)acrylate); olefinic monomers such as ethylene, propylene, isoprene, butadiene and isobutylene; chlorine-containing monomers such as vinyl chloride and vinylidene chloride; isocyanate group-containing monomers such as 2-(meth)acryloyloxyethyl isocyanate; alkoxy group-containing monomers such as methoxyethyl (meth)acrylate and ethoxyethyl (meth)acrylate; vinyl ether monomers such as methyl vinyl ether and ethyl vinyl ether; and polyfunctional monomers having two or more (for example three or more) polymerizable functional groups (for example (meth)

acryloyl groups) in the molecule, such as 1,6-hexanediol di(meth)acrylate and trimethylolpropane tri(meth)acrylate.

The amount of such other copolymerizable components is not particularly limited and may be suitably selected according to the intended purpose and application. From the viewpoint of properly eliciting the effect derived from using the copolymerizable component, ordinarily the amount thereof is appropriately set to 0.05 wt % or more, and may be set to 0.5 wt % or more. From the viewpoint of balancing adhesive performances, ordinarily the content of the other copolymerizable component in the monomer components is appropriately set to 20 wt % or less, and may be set to 10 wt % or less (for instance 5 wt % or less). The art disclosed herein can be preferably implemented also in an embodiment in which the monomer components include substantially no other copolymerizable component. The feature wherein the monomer components include substantially no other copolymerizable component signifies that other copolymerizable components are not utilized, at least intentionally; and instance it is allowable that the monomer components include unintentionally about 0.01 wt % or less of the other copolymerizable component.

The copolymer composition of the acrylic polymer can be appropriately designed so that the glass transition temperature (Tg) of the polymer is about −15° C. or less (for instance in the range from about −70° C. to −15° C.). The Tg of the acrylic polymer denotes herein Tg determined using the Fox equation, on the basis of the composition of the monomer components that are used for synthesizing the polymer. As set out below, the Fox equation is a relational expression of the Tg of a copolymer and the glass transition temperatures Tgi of homopolymers obtained through homopolymerization of the monomers that make up the copolymer.

$$1/Tg = \Sigma(Wi/Tgi)$$

In the Fox equation above, Tg represents the glass transition temperature (units: K) of the copolymer, Wi the weight fraction (copolymerization ratio by weight) of a monomer i in the copolymer, and Tgi the glass transition temperature (units: K) of the homopolymer of the monomer i.

Values disclosed in publicly known sources can be used as the glass transition temperatures of the homopolymers that are utilized in the calculation of Tg. For instance, the following values are used as the glass transition temperatures of the homopolymers of the monomers listed below.

| | |
|---|---|
| 2-ethylhexyl acrylate | −70° C. |
| Isononyl acrylate | −60° C. |
| n-butyl acrylate | −55° C. |
| Ethyl acrylate | −22° C. |
| Methyl acrylate | 8° C. |
| Methyl methacrylate | 105° C. |
| 2-hydroxyethyl acrylate | −15° C. |
| 4-hydroxybutyl acrylate | −40° C. |
| Vinyl acetate | 32° C. |
| Acrylic acid | 106° C. |
| Methacrylic acid | 228° C. |

The values given in "Polymer Handbook" (3rd edition, John Wiley & Sons, Inc., Year 1989) are used herein for the glass transition temperatures of homopolymers of monomers other than those above. Where the above source lists several values of glass transition temperature for a given monomer, the highest value among these is used herein. If a glass transition temperature is not described in the Polymer Handbook, the value thereof can be determined in accordance with the measurement method disclosed in Japanese Patent Application Publication No. 2007-51271.

Although not particularly limited thereto, the Tg of the acrylic polymer is advantageously about −25° C. or lower, preferably about −35° C. or lower, and more preferably about −40° C. or lower, from the viewpoint of tight adhesiveness to the adherend. From the viewpoint of cohesive strength, in one embodiment the Tg of the acrylic polymer may be for instance about −65° C. or higher, or about −60° C. or higher, or about −55° C. or higher. The art disclosed herein can be preferably implemented in an embodiment in which the Tg of the acrylic polymer lies in the range of about −65° C. to −35° C. (for instance about −55° C. to −40° C.). The Tg of the acrylic polymer can be adjusted by modifying as appropriate the monomer composition (i.e. the species and amount ratios of the monomers used for synthesizing the polymer).

The method for producing the acrylic polymer is not particularly limited, and for instance various polymerization methods known as methods for synthesizing acrylic polymers can be used herein, for instance solution polymerization, emulsion polymerization, bulk polymerization, suspension polymerization and photopolymerization. For instance, solution polymerization can be preferably used herein. The polymerization temperature during solution polymerization can be selected as appropriate for instance depending on the species of monomer and solvent used, and on the species of the polymerization initiator, and for instance can be set to about 20° C. to 170° C. (typically about 40° C. to 140° C.).

The solvent (polymerization solvent) used in solution polymerization can be selected from among conventionally known organic solvents. For instance, there can be used one species of solvent selected from among aromatic compounds (typically aromatic hydrocarbons) such as toluene; acetic acid esters such as ethyl acetate; aliphatic or alicyclic hydrocarbons such as hexane and cyclohexane; halogenated alkanes such as 1,2-dichloroethane; lower alcohols (for instance monohydric alcohols with one to four carbon atoms) such as isopropyl alcohol; ethers such as tert-butyl methyl ether; and ketones such as methyl ethyl ketone, or mixed solvents of two or more species of the foregoing.

The initiator used for polymerization can be suitably selected from among conventionally known polymerization initiators, depending on the species of polymerization method. For instance, one or two or more species of azo polymerization initiators such as 2,2'-azobisisobutyronitrile (AIBN) can be preferably used herein. Other examples of the polymerization initiator include persulfates such as potassium persulfate; peroxide initiators such as benzoyl peroxide and hydrogen peroxide; substituted ethane initiators such as phenyl-substituted ethane; and aromatic carbonyl compounds. Yet further examples of the polymerization initiator include redox-species based initiators derived from combining a peroxide and a reducing agent. Such a polymerization initiator can be used singly or in combinations of two or more species. The amount of the polymerization initiator may be an ordinary amount, and for instance, can be selected from a range of about 0.005 to 1 part by weight (typically about 0.01 to 1 part by weight) relative to 100 parts by weight of the monomer components.

The above solution polymerization yields a polymerization reaction solution of a form in which an acrylic polymer is dissolved in an organic solvent. The PSA layer of the art disclosed herein can be formed from a PSA composition that includes an acrylic polymer solution obtained by appropriately post-treating the above polymerization reaction solution or reaction solution. A solution resulting from adjusting the polymerization reaction solution to an appropriate viscosity (concentration) as needed can be used herein as the acrylic polymer solution. Alternatively, an acrylic polymer may be synthesized in accordance with a polymerization method (for instance emulsion polymerization, photopolymerization or bulk polymerization) other than solution polymerization, and be then dissolved in an organic solvent, to thereby prepare an acrylic polymer solution.

The weight-average molecular weight (Mw) of the base polymer (preferably an acrylic polymer) in the art disclosed herein is not particularly limited, can lie in the range of for instance about $10 \times 10^4$ to $500 \times 10^4$. From the viewpoint of adhesive performance, the Mw of the base polymer lies preferably in the range of about $30 \times 10^4$ to $200 \times 10^4$ (more preferably about $45 \times 10^4$ to $150 \times 10^4$, and typically about $65 \times 10^4$ to $130 \times 10^4$). The term Mw refers herein to a standard polystyrene equivalent value determined by GPC (gel permeation chromatography). For instance, model name "HLC-8320 GPC" (column: TSK gel GMH-H (S), by Tosoh Corporation) can be used as the GPC apparatus.

Tackifier Resin

The PSA layer in the art disclosed herein can include a tackifier resin. The peel strength of the PSA sheet can be increased as a result. As the tackifier resin there can be used one or two or more species of resin selected from among various known tackifier resins, for instance phenolic tackifier resins, terpene-based tackifier resins, modified terpene-based tackifier resins, rosin-based tackifier resins, hydrocarbon-based tackifier resins, epoxy-based tackifier resins, polyamide-based tackifier resins, elastomer-based tackifier resins and ketone-based tackifier resins.

Examples of phenolic tackifier resins include terpene phenolic resins, hydrogenated terpene phenolic resins, alkylphenolic resins, and rosin phenolic resins.

The term "terpene phenolic resin" refers to a polymer that includes a terpene residue and a phenol residue, and encompasses conceptually both copolymers of a terpene and a phenol compound (terpene-phenol copolymer resins), and phenol-modified homopolymers or copolymers of a terpene (phenol-modified terpene resins). Preferred examples of terpenes constituting such terpene phenolic resins include monoterpenes such as α-pinene, β-pinene, and limonene (including the d-isomer, l-isomer and d/l isomer (dipentene)). The term hydrogenated terpene phenolic resin denotes a resin having a structure obtained by hydrogenating such a terpene phenolic resin, and is sometimes referred to as a hydrogen-added terpene phenolic resin.

The alkyl phenolic resin is a resin (oil-based phenolic resin) obtained from an alkylphenol and formaldehyde. Examples of alkyl phenolic resins include novolac-type and resole-type resins.

Rosin phenolic resins are typically phenol-modified products of rosins or of various rosin derivatives (including rosin esters, unsaturated fatty acid-modified rosins and unsaturated fatty acid-modified rosin esters). Examples of rosin phenolic resins include rosin phenolic resins obtained for example in accordance with a method that involves adding a phenol to a rosin or to one of the above rosin derivatives, in the presence of an acid catalyst, and performing thermal polymerization.

Examples of terpene-based tackifier resins include polymers of terpenes (typically monoterpenes) such as α-pinene, β-pinene, d-limonene, l-limonene and dipentene. The terpene-based tackifier resin may be a homopolymer of one species of terpene or a copolymer of two or more species of terpenes. Examples of homopolymers of one species of terpene include α-pinene polymers, β-pinene polymers and dipentene polymers. Examples of modified terpene resins include resins resulting from modifying the above terpene resins. Specific examples include styrene-modified terpene resins and hydrogenated terpene resins.

The term "rosin-based tackifier resin" as used herein encompasses conceptually both rosins and rosin derivative resins. Examples of rosins include unmodified rosins (raw rosins) such as gum rosin, wood rosin and tall oil rosin; and modified rosins (hydrogenated rosins, disproportionated rosins, polymerized rosins and other chemically modified rosins) obtained through modification of these unmodified rosins by hydrogenation, disproportionation or polymerization.

The rosin derivative resin is typically a derivative of a rosin such as those described above. The term "rosin resin" as used herein encompasses conceptually derivatives of unmodified rosins and derivatives of modified rosins (including hydrogenated rosins, disproportionated rosins and polymerized rosins). Examples include rosin esters such as unmodified rosin esters which are esters of unmodified rosins and alcohols, and modified rosin esters which are esters of modified rosins and alcohols; unsaturated fatty acid-modified rosins obtained through modification of rosins with unsaturated fatty acids; unsaturated fatty acid-modified rosin esters obtained through modification of rosin esters with unsaturated fatty acids; rosin alcohols obtained by performing a reduction treatment on the carboxy groups of rosins or of various rosin derivatives above (including rosin esters, unsaturated fatty acid-modified rosins and unsaturated fatty acid-modified rosin esters); and metal salts of rosins or of various rosin derivatives above. Specific examples of rosin esters include methyl esters, triethylene glycol esters, glycerin esters and pentaerythritol esters of unmodified rosins or of modified rosins (hydrogenated rosins, disproportionated rosins, polymerized rosins or the like).

Examples of hydrocarbon-based tackifier resins include various hydrocarbon resins such as aliphatic hydrocarbon resins, aromatic hydrocarbon resins, aliphatic cyclic hydrocarbon resins, aliphatic/aromatic petroleum resins (for instance styrene-olefin copolymers), aliphatic/alicyclic petroleum resins, hydrogenated hydrocarbon resins, coumarone resins, and coumarone indene resins.

The softening point of the tackifier resin is not particularly limited. From the viewpoint of enhancing cohesive strength, in one embodiment there can be preferably used a tackifier resin having a softening point (softening temperature) of about 80° C. or higher (preferably about 100° C. or higher). The art disclosed herein can be preferably implemented in an embodiment in which more than 50 wt % (more preferably, more than 70 wt %, for example more than 90 wt %) relative to 100 wt % as the total amount of the tackifier resin included in the PSA layer is a tackifier resin having the above softening point. For example, a phenolic tackifier resin (terpene phenolic resin or the like) having such a softening point can be preferably used herein. The tackifier resin may include a terpene phenolic resin having a softening point of about 135° C. or higher (further, about 140° C. or higher). The upper limit of the softening point of the tackifier resin is not particularly restricted. From the viewpoint of enhancing tight adhesiveness to an adherend, in one embodiment a tackifier resin can be used that has a softening point of about 200° C. or lower (more preferably about 180° C. or lower). The softening point of the tackifier resin can be measured on the basis of a softening point test method (ring and ball method) according to JIS K 2207.

As a preferred embodiment, the tackifier resin may include one or two or more species of a phenolic tackifier resin (typically a terpene phenolic resin). The art disclosed herein can be preferably implemented in an embodiment in which for instance about 25 wt % or more (more preferably about 30 wt % or more) of the tackifier resin, taking the entire amount thereof as 100 wt %, is a terpene phenolic resin. About 50 wt % or more of the total amount of the tackifier resin may be a terpene phenolic resin, and about 80 wt % or more (for instance about 90 wt % or more) may be a terpene phenolic resin. Substantially the totality of the tackifier resin (for instance about 95 to 100 wt %, and further, about 99 to 100 wt %) may be a terpene phenolic resin.

Although not particularly limited thereto, in one embodiment of the art disclosed herein the tackifier resin can include a tackifier resin having a hydroxyl value higher than 20 mgKOH/g. Preferred among the foregoing is a tackifier resin having a hydroxyl value of 30 mgKOH/g or higher. A tackifier resin having a hydroxyl value of 30 mgKOH/g or higher may be referred to hereafter as "high-hydroxyl value resin". A tackifier resin including such a high-hydroxyl value resin allows realizing a PSA layer having superior tight adhesiveness to an adherend, and high cohesive strength. In one embodiment, the tackifier resin may include a high-hydroxyl value resin having a hydroxyl value of 50 mgKOH/g or higher (more preferably 70 mgKOH/g or higher).

A value measured on the basis of a measurement in accordance with a potentiometric titration method pursuant to JIS K 0070:1992 can be used herein as the hydroxyl value.

A resin having a hydroxyl value equal to or higher than a predetermined value, from among the various species of tackifier resin described above, can be used herein as the high-hydroxyl value resin. The high-hydroxyl value resin can be used singly or in combinations of two or more species. For instance, a phenolic tackifier resin having a hydroxyl value of 30 mgKOH/g or higher can be preferably used as the high-hydroxyl value resin. In a preferred embodiment, at least a terpene phenolic resin having a hydroxyl value 30 mgKOH/g or higher is used as the tackifier resin. A terpene phenolic resin is convenient herein since the hydroxyl value thereof can be controlled arbitrarily based on the copolymerization ratio of phenol.

The upper limit of the hydroxyl value of the high-hydroxyl value resin is not particularly restricted, and for instance from the viewpoint of compatibility with the base polymer, ordinarily the hydroxyl value of the high-hydroxyl value resin is appropriately about 200 mgKOH/g or less, preferably about 180 mgKOH/g or less, more preferably about 160 mgKOH/g or less and yet more preferably about 140 mgKOH/g or less. The art disclosed herein can be preferably implemented in an embodiment in which the tackifier resin includes a high-hydroxyl value resin (for instance a phenolic tackifier resin, and preferably a terpene phenolic resin) having a hydroxyl value of 30 to 160 mgKOH/g. In one embodiment, there can be preferably used a high-hydroxyl value resin having a hydroxyl value of 30 to 80 mgKOH/g (for instance 30 to 65 mgKOH/g). In another embodiment there can be preferably used a high-hydroxyl value resin having a hydroxyl value of 70 to 140 mgKOH/g.

Although not particularly limited thereto, in a case where a high-hydroxyl value resin is used, the proportion of the high-hydroxyl value resin (for instance terpene phenolic resin) in the tackifier resin included in the PSA layer can be set, although not particularly limited thereto, for instance to about 25 wt % or more, and is preferably about 30 wt % or more, and more preferably about 50 wt % or more (for instance about 80 wt % or more, typically about 90 wt % or more). Substantially the totality of the tackifier resin (for instance about 95 to 100 wt %, and further, about 99 to 100 wt %) may be a high-hydroxyl value resin.

In a case where the PSA layer includes a tackifier resin, the amount of the tackifier resin is not particularly limited, and for instance can be set as appropriate to lie in the range of about 1 to 100 parts by weight relative to 100 parts by weight of the base polymer. From the viewpoint of suitably eliciting the effect of increasing peel strength, ordinarily the amount of tackifier resin relative to 100 parts by weight of the base polymer (for instance acrylic polymer) is appropriately set to 5 parts by weight or more, and may be preferably set to 10 parts by weight or more, or 15 parts by weight or more. From the viewpoint of cohesive strength, ordinarily the amount of tackifier resin relative to 100 parts by weight of the base polymer (for instance acrylic polymer) can be set appropriately to 50 parts by weight or less, and may be set to 40 parts by weight or less, or 30 parts by weight or less.

Rust Inhibitor

The PSA layer according to a preferred embodiment can include a rust inhibitor. An azole-based rust inhibitor can be preferably used as the rust inhibitor. As the azole-based rust inhibitor there is preferably used an inhibitor having, as an effective component, an azole-based compound being a five-membered ring aromatic compound having two or more hetero atoms at least one of which is a nitrogen atom. An azole-based compound conventionally used as a rust inhibitor of metals such as copper can be used herein as the azole-based compound.

Examples of the azole-based compound include azoles such as imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole and 1,2,3,4-thiatriazole; derivatives thereof; amine salts thereof; and metal salts thereof. Examples of derivatives of azoles include compounds having a structure that includes a condensed ring of an azole ring and another ring such as a benzene ring. Concrete examples include indazole, benzimidazole, benzotriazole (i.e. 1,2,3-benzotriazole having a structure in which the azole ring of 1,2,3-triazole is condensed with a benzene ring), and benzothiazole, and derivatives thereof such as alkylbenzotriazoles (for example 5-methylbenzotriazole, 5-ethylbenzotriazole, 5-n-propylbenzotriazole, 5-isobutylbenzotriazole and 4-methylbenzotriazole), alkoxybenzotriazoles (for example 5-methoxybenzotriazole), alkylaminobenzotriazoles, alkylaminosulfonylbenzotriazoles, mercaptobenzotriazole, hydroxybenzotriazole, nitrobenzotriazoles (for example 4-nitrobenzotriazole), halobenzotriazoles (for example 5-chlorobenzotriazole), hydroxyalkylbenzotriazoles, hydroxybenzotriazole, aminobenzotriazole, (substituted aminomethyl)-tolyltriazoles, carboxybenzotriazole, N-alkylbenzotriazoles, bisbenzotriazole, naphthotriazole, mercaptobenzothiazole, aminobenzothiazole, as well as amine salts thereof, and metal salts thereof. Other examples of derivatives of azoles include azole derivatives having a non-condensed ring structure, for example compounds with a structure having a substituent on a non-condensed azole ring, for example 3-amino-1,2,4-triazole and 5-phenyl-1H-tetrazole. These azole-based compounds can be used singly or in combinations of two or more species.

Preferred examples of compounds that can be used as the azole-based rust inhibitor include benzotriazole-based rust inhibitors having a benzotriazole compound as an effective component. The art disclosed herein can be preferably implemented for instance in an embodiment in which the base polymer is an acrylic polymer and the rust inhibitor is a benzotriazole-based rust inhibitor. In such an embodiment, a PSA sheet having a good metal corrosion preventing property and superior adhesion reliability can be advantageously realized. Preferred examples of the benzotriazole-based compound include 1,2,3-benzotriazole, 5-methylbenzotriazole, 4-methylbenzotriazole and carboxybenzotriazole.

Although not particularly limited thereto, in one embodiment the content the azole-based rust inhibitor in the PSA layer can be set to an amount corresponding to 0.2 parts by weight or more with respect to 10 parts by weight of the carboxy group-containing monomer included in the monomer components that make up the base polymer. The content of the azole-based rust inhibitor per 10 parts by weight of the carboxy group-containing monomer may be 0.5 parts by weight or more, or 1 part by weight or more, or 1.5 parts by weight or more. The metal corrosion preventing effect tends to become more pronounced by increasing the amount of the azole-based rust inhibitor per 10 parts by weight of the carboxy group-containing monomer. In some embodiments, the content of the azole-based rust inhibitor per 10 parts by weight of the carboxy group-containing monomer may be for instance 4 parts by weight or more, and for instance 6 parts by weight or more. From the viewpoint of suitably achieving both a metal corrosion preventing effect and adhesion reliability, the content of the azole-based rust inhibitor per 10 parts by weight of the carboxy group-containing monomer may be for instance 30 parts by weight or less, 20 parts by weight or less, 15 parts by weight or less, 10 parts by weight or less, or 5 parts by weight or less (for example 3 parts by weight or less).

Examples of rust inhibitors other than azole-based rust inhibitors and which can be included in the PSA layer disclosed herein are not particularly limited, and include amine compounds, nitrites, ammonium benzoate, ammonium phthalate, ammonium stearate, ammonium palmitate, ammonium oleate, ammonium carbonate, dicyclohexylaminebenzoates, urea, urotropin, thiourea, phenyl carbamate and cyclohexylammonium-N-cyclohexyl carbamate (CHC). These rust inhibitors (non-azole-based rust inhibitor) other than azole-based ones can be used singly or in combinations of two or more species. The art disclosed herein can be preferably realized also in an embodiment where a non-azole-based rust inhibitor is substantially not used.

Examples of the amine compound include hydroxy group-containing amine compounds such as 2-amino-2-methyl-1-propanol, monoethanolamine, monoisopropanolamine, diethylethanolamine, ammonia, and ammonia water; cyclic amines such as morpholine; cyclic alkylamine compounds such as cyclohexylamine; and linear alkylamines such as 3-methoxypropyl amine. Examples of nitrites include dicyclohexylammonium nitrite (DICHAN), diisopropylammonium nitrite (DIPAN), sodium nitrite, potassium nitrite, and calcium nitrite.

The content of the rust inhibitor (preferably an azole-based rust inhibitor, for instance a benzotriazole-based rust inhibitor) is not particularly limited, and for instance can be set to 0.01 parts by weight or more (typically 0.05 parts by weight or more) relative to 100 parts by weight of the base polymer. From the viewpoint of eliciting a more pronounced metal corrosion preventing effect, the content of the rust inhibitor may be 0.1 parts by weight or more, or 0.3 parts by weight or more, or 0.5 parts by weight or more. From the viewpoint of increasing the cohesive strength of the PSA, ordinarily the content of the rust inhibitor is appropriately set to less than 8 parts by weight and may be set to 6 parts by weight or less, or 5 parts by weight or less, relative to 100 parts by weight of the base polymer.

Colorant

So long as the effect of the art disclosed herein is not impaired, the PSA layer may include a colorant other than carbon black particles, for instance from the viewpoint of adjusting optical transparency (light shielding). A conventionally known pigment or dye can be used as the colorant. Examples of the pigment include inorganic pigments such as zinc carbonate, zinc oxide, zinc sulfide, talc, kaolin, calcium carbonate, titanium oxide, silica, lithium fluoride, calcium fluoride, barium sulfate, alumina, zirconia, iron oxide-based pigments, iron hydroxide-based pigments, chromium oxide-based pigments, spinel-type fired pigments, chromic acid-based pigments, chromium vermilion-based pigments, iron blue-based pigments, aluminum powder-based pigments, bronze powder-based pigments, silver powder-based pigments, and calcium phosphate; and organic pigments such as phthalocyanine-based pigments, azo-based pigments, condensed azo-based pigments, azo lake-based pigments, anthraquinone-based pigments, perylene/perinone-based pigments, indigo-based pigments, thioindigo-based pigments, isoindolinone-based pigments, azomethine-based pigments, dioxazine-based pigments, quinacridone-based pigments, aniline black-based pigments, and triphenylmethane-based pigments. Examples of the dyes include azo-based dyes, anthraquinone, quinophthalone, styryl-based dyes, diphenylmethane, triphenylmethane, oxazine, triazine, xanthan, azomethine, acridine and diazine. The colorant can be used singly or in combinations of two or more species.

Concrete examples of black colorants other than carbon black particles include graphite, copper oxide, manganese dioxide, aniline black, perylene black, titanium black, cyanine black, activated carbon, ferrites (for instance nonmagnetic ferrites and magnetic ferrites), magnetite, chromium oxide, iron oxide, molybdenum disulfide, chromium complexes and anthraquinone-based colorants.

The content of the colorant other than carbon black particles in the PSA layer can be set to less than 13 wt % from the viewpoint of not detracting from the effect of the art disclosed herein, and may be preferably less than 10 wt %, for instance less than 5 wt %, and may be set to less than 3.0 wt % (for instance less than 2.0 wt %, and further less than 1 wt %). The art disclosed herein can be preferably implemented in an embodiment in which the PSA layer includes substantially no colorant other than carbon black particles. In the present specification the wording "substantially not including" signifies no deliberate addition, and for instance the content in the PSA layer can be 0.3 wt % or less (for instance 0.1 wt % or less, and typically 0.01 wt % or less).

Crosslinking Agent

In the art disclosed herein the PSA composition used for forming the PSA layer may include a crosslinking agent as needed. The species of crosslinking agent is not particularly limited, and conventionally known crosslinking agents can be selected and used as appropriate. Examples of such crosslinking agents include isocyanate-based crosslinking agents, epoxy-based crosslinking agents, oxazoline-based crosslinking agents, aziridine-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents and amine-based crosslinking agents. The crosslinking agent can be used singly or in combinations of two or more species.

In a preferred embodiment, a combination of an isocyanate-based crosslinking agent and at least one crosslinking agent having a species of crosslinking reactive group different from that of the isocyanate-based crosslinking agent is used as the crosslinking agent herein. The art disclosed herein allows bringing out superior cohesive strength through the use of a combination of an isocyanate-based crosslinking agent and a crosslinking agent other than an isocyanate-based crosslinking agent (i.e. a crosslinking agent, hereafter also referred to as "non-isocyanate-based crosslinking agent", having a species of crosslinking reactive group different from that of the isocyanate-based crosslinking agent). For instance, both high heat-resistant cohesive strength and superior metal corrosion prevention can be achieved including a rust inhibitor such as an azole-based rust inhibitor. The PSA layer in the art disclosed herein can include the crosslinking agent, for instance with the PSA layer being in a form after a crosslinking reaction, a form before a crosslinking reaction, a form after a partial crosslinking reaction, as well as in intermediate stages and combinations of the foregoing. Typically, the crosslinking agent is included in the PSA layer solely in the form after the crosslinking reaction.

A polyfunctional isocyanate (which refers to a compound having in average of two or more isocyanate groups per molecule, and encompasses compounds having an isocyanurate structure) can be preferably used as the isocyanate-based crosslinking agent. The isocyanate-based crosslinking agent can be used singly or in combinations of two or more species.

Examples of polyfunctional isocyanates include aliphatic polyisocyanates, alicyclic polyisocyanates and aromatic polyisocyanates.

Concrete examples of aliphatic polyisocyanates include 1,2-ethylene diisocyanate; tetramethylene diisocyanates such as 1,2-tetramethylene diisocyanate, 1,3-tetramethylene diisocyanate and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate and 2,5-hexamethylene diisocyanate; as well as 2-methyl-1,5-pentane diisocyanate, 3-methyl-1,5-pentane diisocyanate and lysine diisocyanate.

Concrete examples of alicyclic polyisocyanates include isophorone diisocyanate; cyclohexyl diisocyanates such as 1,2-cyclohexyl diisocyanate, 1,3-cyclohexyl diisocyanate and 1,4-cyclohexyl diisocyanate; cyclopentyl diisocyanates such as 1,2-cyclopentyl diisocyanate and 1,3-cyclopentyl diisocyanate; as well as hydrogenated xylylene diisocyanate, hydrogenated tolylene isocyanate, hydrogenated diphenylmethane diisocyanate, hydrogenated tetramethylxylene diisocyanate and 4,4'-dicyclohexylmethane diisocyanate.

Concrete examples of aromatic polyisocyanates include 2,4-tolylene isocyanate, 2,6-tolylene isocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate and xylylene-1,3-diisocyanate.

Examples of preferred polyfunctional isocyanates include polyfunctional isocyanates having in average three or more isocyanate groups per molecule. Such a trifunctional or higher polyfunctional isocyanate can be a multimer (typically a dimer or a trimer), a derivative (for instance an addition reaction product of a polyhydric alcohol and two or more polyfunctional isocyanate molecules), a polymer or the like, of a bifunctional, tri- or higher-functional isocyanate. Examples include polyfunctional isocyanates such as dimers and trimers of diphenylmethane diisocyanate, isocyanurates (trimer adducts of isocyanurate structure) of hexamethylene diisocyanate, reaction products of trimethylol propane and tolylene diisocyanate, reaction products of trimethylol propane and hexamethylene diisocyanate, polymethylene polyphenyl isocyanate, polyether polyisocyanate and polyester polyisocyanate. Commercially available polyfunctional isocyanates include product name "DURANATE TPA-100" by Asahi Kasei Chemicals Corporation, and product names "CORONATE L", "CORONATE HL", "CORONATE HK", "CORONATE HX" and "CORONATE 2096" by Tosoh Corporation.

The amount of the isocyanate-based crosslinking agent is not particularly limited. For instance, the amount can be set to about 0.5 parts by weight or more relative to 100 parts by weight of the base polymer. From the viewpoint of achieving higher cohesive strength (in particular heat-resistant cohesive strength), the amount of the isocyanate-based crosslinking agent may be for instance set to 1.0 parts by weight or more, or 1.5 parts by weight or more, relative to 100 parts by weight of the base polymer. From the viewpoint of improving tight adhesiveness to an adherend, on the other hand, ordinarily the amount of the isocyanate-based crosslinking agent is appropriately set to 10 parts by weight or less, and may be set to 8 parts by weight or less, or 5 parts by weight or less (for instance 3 parts by weight or less) relative to 100 parts by weight of the base polymer. In one embodiment, the amount of isocyanate-based crosslinking agent relative to 100 parts by weight of the base polymer can be set to about 1 part by weight to about 7 parts by weight (for instance about 1.5 parts by weight to about 5 parts by weight).

The species of the non-isocyanate-based crosslinking agent that can be used in combination with the isocyanate-based crosslinking agent is not particularly limited, and can be selected and used from among conventionally known crosslinking agents. Examples of such crosslinking agents include for instance epoxy-based crosslinking agents, oxazoline-based crosslinking agents, aziridine-based crosslinking agents, melamine-based crosslinking agents, carbodiimide-based crosslinking agents, hydrazine-based crosslinking agents, amine-based crosslinking agents, peroxide-based crosslinking agents, metal chelate-based crosslinking agents, metal alkoxide-based crosslinking agents, metal salt-based crosslinking agents and silane coupling agents. The non-isocyanate-based crosslinking agent can be used singly or in combinations of two or more species.

In a preferred embodiment, an epoxy-based crosslinking agent can be used as the non-isocyanate-based crosslinking agent. A compound having two or more epoxy groups in the molecule can be used, without particular limitations, as the epoxy-based crosslinking agent. Preferred herein is an epoxy-based crosslinking agent having 3 to 5 epoxy groups in the molecule. The epoxy-based crosslinking agent can be used singly or in combinations of two or more species.

Although not particularly limited thereto, concrete examples of the epoxy-based crosslinking agent include N,N,N',N'-tetraglycidyl-m-xylene diamine, 1,3-bis(N,N- diglycidylaminomethyl)cyclohexane, 1,6-hexanediol diglycidyl ether, polyethylene glycol diglycidyl ether and polyglycerol polyglycidyl ether. Examples of commercially available epoxy-based crosslinking agents include product names "TETRAD-C" and "TETRAD-X", both by Mitsubishi Gas Chemical Company, Inc., product name "EPICLON CR-5L" by DIC Corporation, product name "DENACOL EX-512" by Nagase ChemteX Corporation, and product name "TEPIC-G" by Nissan Chemical Industries, Ltd.

The amount of the epoxy-based crosslinking agent is not particularly limited. For instance, the amount of the epoxy-based crosslinking can be set to exceed 0 parts by weight and up to about 1 part by weight (typically from about 0.001 to 0.5 parts by weight) relative to 100 parts by weight of the base polymer. From the viewpoint of suitably eliciting the effect of improving cohesive strength, ordinarily the amount of the epoxy-based crosslinking agent is appropriately set to about 0.002 parts by weight or more, and is preferably about 0.005 parts by weight or more, more preferably about 0.008 parts by weight or more, relative to 100 parts by weight of the base polymer. From the viewpoint of improving tight adhesiveness to an adherend, ordinarily the amount of the epoxy-based crosslinking agent can be appropriately set to about 0.2 parts by weight or less, and is preferably set to about 0.1 parts by weight or less, more preferably less than about 0.05 parts by weight, yet more preferably less than about 0.03 parts by weight (for instance about 0.025 parts by weight or less), relative to 100 parts by weight of the base polymer.

In the art disclosed herein, the relationship between the content of the isocyanate-based crosslinking agent and the content of the non-isocyanate-based crosslinking agent (for instance an epoxy-based crosslinking agent) is not particularly limited. For instance, the content of the non-isocyanate-based crosslinking agent can be set to about 1/50 or less of the content of the isocyanate-based crosslinking agent. From the viewpoint of yet more suitably combining tight adhesiveness to an adherend and cohesive strength, the content of the non-isocyanate-based crosslinking agent is appropriately set to about 1/75 or less, preferably about 1/100 or less (for instance 1/150 or less), on a weight basis, of the content of the isocyanate-based crosslinking agent. From the viewpoint of suitably eliciting the effect derived from using an isocyanate-based crosslinking agent and a non-isocyanate-based crosslinking agent (for instance an epoxy-based crosslinking agent) in combination, ordinarily the content of the non-isocyanate-based crosslinking agent is appropriately set to about 1/1000 or more, for instance about 1/500 or more, of the content of the isocyanate-based crosslinking agent.

The amount (total amount) of the crosslinking agent is not particularly limited. For instance, the amount of crosslinking agent can be set to about 10 parts by weight or less, and preferably can be selected from among the ranges of about 0.005 to 10 parts by weight, more preferably about 0.01 to 5 parts by weight, relative to 100 parts by weight of the base polymer (preferably an acrylic polymer).

Other Additives

In addition to the above-described components, the PSA composition may include as necessary various additives that are common in the field of PSAs, such as a leveling agent, a crosslinking aid, a plasticizer, a softener, an antistatic agent, an anti-aging agent, an ultraviolet absorber, an antioxidant and/or a light stabilizer. Such conventionally known additives can be used in accordance with ordinary methods, and are not particularly characterizing features of the present invention. A detailed explanation of such additives will therefore be omitted.

The PSA layer disclosed herein (layer made of a PSA) can be formed from a water-based PSA composition, a solvent-based PSA composition, a hot-melt PSA composition or an active energy ray-curable PSA composition which is susceptible to irradiation with active energy rays such as UV rays and electron beams. Water-based PSA compositions denote herein PSA compositions of a form including a PSA (PSA layer-forming component) in a solvent having water as a main component (aqueous solvent), and typically encompass for instance water-dispersed PSA compositions (compositions of a form in which at least part of the PSA is dispersed in water). Solvent-based PSA compositions refer to PSA compositions in a form including a PSA in an organic solvent. For instance, from the viewpoint of adhesive characteristics, the art disclosed herein can be preferably implemented in an embodiment in which the PSA layer is formed out of a solvent-based PSA composition.

In the art disclosed herein the manner in which the carbon black particles are added to the PSA composition is not particularly limited. The carbon black particles can be added to the PSA composition in the form of a dispersion in which the above particles are dispersed in a dispersion medium. The dispersion medium that makes up the dispersion is not particularly limited, and may be water (for instance ion-exchanged water, reverse osmosis water or distilled water), various organic solvents (alcohols such as ethanol; ketones such as acetone; ethers such as butyl cellosolve or propylene glycol monomethylether acetate; esters such as ethyl acetate; and aromatic hydrocarbons such as toluene; as well as mixed solvents of the foregoing), and aqueous mixed solvents of water and the above organic solvents. The dispersion may include the above dispersant. Through mixing of the above dispersion with the PSA composition, the PSA composition can include carbon black particles, and can further include a dispersant.

Formation of PSA Layer

The PSA layer disclosed herein can be formed in accordance with a conventionally known method. For instance, a method can be used that involves forming the PSA layer by applying a PSA composition to a surface having releasability (release surface), with drying. In a PSA sheet having a support substrate, for instance a method (direct method) can be used that involves forming the PSA layer by directly applying a PSA composition (typically by coating) to the support substrate, with drying. A method (transfer method) may also be resorted to in which a PSA composition is applied to a surface having releasability (release surface), with drying, to thereby form the PSA layer on the surface, whereupon the PSA layer is transferred to a support substrate. For instance, the surface of the below-described release liner can be preferably used as the release surface. The PSA layer disclosed herein is typically formed continuously, but is not limited to such an embodiment, and for instance the PSA layer may be formed as a regular or random pattern of stripes or the like.

The PSA composition can be applied using a conventionally known coater, for instance, a gravure roll coater, a die coater or a bar coater. Alternatively, the PSA composition can be applied by impregnation or curtain coating.

For instance, in terms of accelerating the crosslinking reaction and improving production efficiency, it is preferable to dry the PSA composition under heating. The drying temperature can for instance be set to about 40° C. to 150° C., and ordinarily is preferably set to about 60° C. to 130° C. After drying the PSA composition, aging may further be performed for instance for the purpose of adjusting the migration of components within the PSA layer, promoting the crosslinking reaction, and relieving strain that may be present in the PSA layer.

The thickness of the PSA layer is not particularly limited. In terms of preventing the PSA sheet from becoming excessively thick, ordinarily the thickness of the PSA layer is appropriately about 100 μm or less, and is preferably about 70 μm or less, and more preferably about 50 μm or less (for example about 30 μm or less). The thickness of the PSA layer can be set to about 35 μm or less, and may be for instance about 25 μm or less, further, about 15 μm or less, or about 10 μm or less (for instance about 7 μm or less). In the art disclosed herein superior light shielding is brought out on the basis of the dispersibility of the carbon black particles in the PSA layer, and accordingly superior light shielding is realized also in a PSA layer having a limited thickness such as that described above. Further, the target light shielding can be realized through addition of a small amount of carbon black particles, and hence light shielding and adhesive characteristics can both be achieved for instance in that it becomes possible to secure a predetermined or higher peel strength, even for a limited PSA layer thickness such as that described above. The lower limit of the thickness of the PSA layer is not particularly restricted, but is advantageously set to be about 1 μm or more, from the viewpoint of tight adhesiveness to an adherend, and is appropriately set to about 3 μm or more, preferably about 5 μm or more, more preferably about 8 μm or more, yet more preferably about 12 μm or more (for instance about 15 μm or more), from the viewpoint of enhancing light shielding.

The total light transmittance of the PSA layer thus formed depends on the thickness of the PSA layer, and accordingly is not limited to a specific range. For instance, the PSA layer disclosed herein exhibits a total light transmittance lower than 10%. In a preferred embodiment, the total light transmittance of the PSA layer is for instance lower than 5%, more preferably lower than 3%, yet more preferably lower than 1%, and particularly preferably lower than 0.5% (for instance lower than 0.1%). Through formation of the PSA layer exhibiting the above transmittance superior light shielding can be preferably brought out in the vertical direction (thickness direction) and the horizontal direction (adhesive surface direction) of the PSA sheet. The lower limit of the total light transmittance is not particularly restricted, and may be substantially 0%, that is, at or below the detection limit. The total light transmittance of the PSA layer can be measured in accordance with the same method as that of the total light transmittance of the PSA sheet, described below.

In a preferred embodiment, the PSA layer has a thickness of 15 μm or less, and a total light transmittance lower than 10%. The art disclosed herein brings out superior light shielding, i.e. total light transmittance lower than 10%, in a PSA layer the thickness whereof is limited to 15 μm or less, as described above. The total light transmittance of a PSA layer having a thickness of 15 μm or less is preferably lower than 8%, more preferably lower than 6%, yet more preferably lower than 3%, particularly preferably lower than 1%, and most preferably lower than 0.3% (for instance lower than 0.01%). The thickness of a PSA layer having the above total light transmittance can be about 10 μm or less (for instance about 7 μm or less). The lower limit of the thickness of the PSA layer in this embodiment is about 1 μm or more, and is appropriately set to about 3 μm or more, and from the viewpoint of adhesive characteristics such as adhesive strength, may be about 5 μm or more (for instance about 8 μm or more, and further, about 12 μm or more).

In another preferred embodiment, the PSA layer has a thickness of 25 μm or less, and a total light transmittance lower than 3%. The art disclosed herein allows realizing superior light shielding, i.e. a total light transmittance lower than 3%, in a PSA layer the thickness whereof is limited to 25 μm or less, as described above. The total light transmittance of a PSA layer having a thickness of 25 μm or less is preferably lower than 2%, more preferably lower than 1%, yet more preferably lower than 0.3%, particularly preferably lower than 0.03% and most preferably lower than 0.01%. The thickness of a PSA layer having the above total light transmittance can be about 22 μm or less (for instance about 18 μm or less). The lower limit of the thickness of the PSA layer in this embodiment is larger than 15 μm, and may be about 20 μm or more (for instance about 23 μm or more) from the viewpoint of adhesive characteristics such as adhesive strength.

In yet another preferred embodiment, the PSA layer has a thickness of 35 μm or less, and a total light transmittance lower than 1%. The art disclosed herein allows realizing superior light shielding, i.e. a total light transmittance lower than 1%, in a PSA layer the thickness whereof is limited to 35 μm or less, as described above. The total light transmittance of a PSA layer having a thickness of 35 μm or less is preferably lower than 0.5%, more preferably lower than 0.2%, yet more preferably lower than 0.1%, particularly preferably lower than 0.03% and most preferably lower than 0.01%. The thickness of a PSA layer having the above total light transmittance can be about 32 μm or less (for instance about 28 μm or less). The lower limit of the thickness of the PSA layer in this embodiment is larger than 25 μm, and may be about 30 μm or more (for instance about 33 μm or more) from the viewpoint of adhesive characteristics such as adhesive strength.

In even yet another preferred embodiment, the PSA layer has a thickness of 50 μm or less, and a total light transmittance lower than 0.5%. The art disclosed herein allows realizing superior light shielding, i.e. a total light transmittance lower than 0.5%, in a PSA layer the thickness whereof is limited to 50 μm or less, as described above. The total light transmittance of a PSA layer having a thickness of 50 μm or less is preferably lower than 0.1%, more preferably lower than 0.05%, yet more preferably lower than 0.02%, and particularly preferably lower than 0.01%. The thickness of a PSA layer having the above total light transmittance can be about 45 μm or less (for instance about 40 μm or less). The lower limit of the thickness of the PSA layer in this embodiment is larger than 35 μm, and may be about 38 μm or more, or about 43 μm or more (for instance about 47 μm or more), from the viewpoint of adhesive characteristics such as adhesive strength.

Support Substrate

In an embodiment in which the PSA sheet disclosed herein is a substrate-supported PSA sheet of a single-faced PSA or a double-sided PSA type, examples of the substrate (backing) that supports the PSA layer include a resin film, paper, cloth, a rubber sheet, a foam sheet, a metal foil and composites thereof. Examples of the resin film include polyolefin films of polyethylene (PE), polypropylene (PP) or an ethylene-propylene copolymer; polyester films of polyethylene terephthalate (PET) or the like; vinyl chloride resin films; vinyl acetate resin films; polyimide resin films; polyamide resin films; fluororesin films; and cellophane. Examples of paper include Japanese paper, kraft paper, glassine paper, high-quality paper, synthetic paper and top-coat paper. Examples of cloth include woven fabrics and nonwoven fabrics made of various fibrous substances which are used singly or blended with each other. Examples of the fibrous substance include cotton, staple fibers, Manila hemp, pulp, rayon, acetate fibers, polyester fibers, polyvinyl alcohol fibers, polyamide fibers and polyolefin fibers. Examples of rubber sheets include natural rubber sheets and butyl rubber sheets. Examples of foam sheets include foamed polyurethane sheets and foamed polychloroprene rubber sheets. Examples of the metal foil include an aluminum foil and a copper foil.

The term "nonwoven fabric" as used herein refers conceptually to a nonwoven fabric for PSA sheets and which is mainly used in the field of PSA tapes and other PSA sheets, and is typically a nonwoven fabric (sometimes referred to as so-called "paper") such as those prepared using a general paper-making machine. The term resin film denotes herein typically a nonporous resin sheet which is conceptually distinguished from for example a nonwoven fabric (i.e., not encompassing a nonwoven fabric). The resin film may be a non-stretched film, a uniaxially stretched film, or a biaxially stretched film.

A substrate having a resin film as a base film can be preferably used as the support substrate that makes up the PSA sheet with substrate. The base film is typically an (independent) member capable of retaining its shape independently. The support substrate in the art disclosed herein can be substantially made up of such a base film. Alternatively, the support substrate may include an auxiliary layer, besides the base film. Examples of the auxiliary layer include a colored layer, a reflective layer, an undercoat layer and an antistatic layer, provided on the surface of the base film.

The resin film is a film having a resin material as a main component (for instance, component in a content exceeding 50 wt % of the resin film). Examples of the resin film include polyolefin resin films for instance of polyethylene (PE), polypropylene (PP) or of ethylene-propylene copolymers; polyester resin films for instance of polyethylene terephthalate (PET), polybutylene terephthalate (PBT) or of polyethylene naphthalate (PEN); vinyl chloride resin films; vinyl acetate resin films; polyimide resin films; polyamide resin films; fluororesin films; and cellophane. The resin film may be a rubber film such as a natural rubber film or a butyl rubber film. Preferred among the foregoing are polyester films, in terms of handleability and processability, and particularly preferably PET films. In the present specification the term "resin film" denotes typically a non-porous sheet, conceptually distinct from so-called nonwoven fabrics and woven fabrics (in other words, conceptually excluding nonwoven fabrics and woven fabrics).

The resin film can include a colorant. The optical transparency (light shielding) of the resin film can be adjusted thereby. Adjustment of the optical transparency (for instance vertical transmittance) of the resin film can be helpful also in adjusting the optical transparency of a substrate having the resin film, and further the optical transparency of the PSA sheet having the substrate.

Conventionally known pigments and dyes identical to the colorants that can be incorporated into the PSA layer can be used as the colorant herein. The color of the colorant is not particularly limited, and the colorant may be colored or colorless. The color of the colorant can be for instance black, gray, white, red, blue, yellow, green, yellow-green, orange, purple, gold, silver or pearl.

In one embodiment a black colorant can be preferably used, since in that case light shielding (for instance vertical light transmittance) can be efficiently adjusted using a small amount of colorant. Concrete examples of black colorants include those illustrated as colorants that can be incorporated into the PSA layer. In a preferred embodiment there can be used a pigment (for instance a particulate black colorant such as carbon black) having an average particle size of 10 nm to 500 nm, more preferably 10 nm to 120 nm.

In one embodiment the resin film may include a white colorant. Examples of white colorants include inorganic white colorants such as titanium oxide (titanium dioxide such as rutile titanium dioxide and anatase titanium dioxide), zinc oxide, aluminum oxide, silicon oxide, zirconium oxide, magnesium oxide, calcium oxide, tin oxide, barium oxide, cesium oxide, yttrium oxide, magnesium carbonate, calcium carbonate (light calcium carbonate and heavy calcium carbonate) barium carbonate, zinc carbonate, aluminum hydroxide, calcium hydroxide, magnesium hydroxide, zinc hydroxide, aluminum silicate, magnesium silicate, calcium silicate, barium sulfate, calcium sulfate, barium stearate, zinc white, zinc sulfide, talc, silica, alumina, clay, kaolin, titanium phosphate, mica, plaster, white carbon, diatomaceous earth, bentonite, lithopone, zeolites, sericite and hydrous halloysite; and organic white colorants such as acrylic resin particles, polystyrene resin particles, polyurethane resin particles, amide resin particles, polycarbonate resin particles, silicone resin particles, urea-formalin resin particles and melamine resin particles.

The amount of colorant in the resin film is not particularly limited, and can be appropriately adjusted so as to enable imparting desired optical characteristics. Ordinarily, the amount of colorant is appropriately set to about 0.1 to 30 wt % of the weight of the resin film, and can be set to for instance 0.1 to 25 wt % (typically 0.1 to 20 wt %).

The resin film may include as needed various additives such as a filler (for instance an inorganic filler or organic filler), a dispersant (for instance a surfactant), an anti-aging agent, an antioxidant, an ultraviolet absorber, an antistatic agent, a lubricant and/or a plasticizer. The number of various additives is ordinarily less than 30 wt % (for instance less than 20 wt %, and typically less than 10 wt %).

The resin film may have a single-layer structure, or may have a multilayer structure of two, three or more layers. The resin film has preferably a single-layer structure, from the viewpoint of shape stability. In the case of a multilayer structure, at least one layer (preferably all layers) has a continuous structure of the resin (for instance a polyester resin). The method used for producing the resin film may be a conventionally known method, as appropriate, and is not particularly limited. For instance, a conventionally known general film-forming method can be used as appropriate, for instance extrusion molding, inflation molding, T-die casting or calendar roll molding.

The support substrate may be colored by a colored layer disposed on the surface of the base film (preferably the resin film). In the substrate including a base film and colored layer, the base film may or may not include a colorant. The colored layer may be disposed on either one of the surfaces of the base film, or may be on each surface of the base film. In a constitution wherein the colored layer is disposed on each surface of the base film, the features of the respective colored layers may be identical or different.

Such a colored layer is typically formed through application of a composition for colored layer formation, including a colorant and a binder, onto the base film. Conventionally known pigments and dyes, identical to the colorants that can be incorporated into the PSA layer and the resin film, can be used as the colorant herein. Known materials in the fields of coatings and printing can be used, without particular limitations, as the binder. Examples include polyurethanes, phenolic resins, epoxy resins, urea melamine resins and polymethyl methacrylate. The composition for colored layer formation can be for instance of solvent-based, ultraviolet-curable or thermosetting composition. To form the colored layer a means conventionally resorted to for forming colored layers can be used herein, without particular limitations. For instance, a method can be preferably used for forming the colored layer (printed layer) by gravure printing, flexographic printing or offset printing.

The colored layer may have a single-layer structure formed of one layer, or may have a multilayer structure with two, three or more sub-colored layers. A colored layer of multilayer structure having two or more sub-colored layers can be formed for example through repeated application (for example by printing) of for instance a composition for colored layer formation. The colors and the amounts of the colorants included in the respective sub-colored layers may be identical or different. In colored layers for imparting light-shielding properties it is particularly meaningful to adopt a multilayer structure, from the viewpoint of preventing the occurrence of pinholes and enhancing the reliability of light leakage prevention.

Ordinarily, the thickness of the colored layer as a whole is appropriately about 1 μm to 10 μm, and can be set preferably to about 1 μm to 7 μm, for instance about 1 μm to 5 μm. In a colored layer having two or more sub-colored layers, preferably, the thickness of each sub-colored layer is set ordinarily to about 1 μm to 2 μm.

The thickness of the support substrate is not particularly limited. The thickness of the support substrate can be for instance set to about 200 μm or less (for instance about 100 μm or less) from the viewpoint of preventing the PSA sheet from becoming excessively thick. The thickness of the support substrate may be about 70 μm or less, or about 30 μm or less, or about 10 μm or less (for instance about 5 μm or less), for instance depending on the purpose and manner of use of the PSA sheet. The lower limit of the thickness of the support substrate is not particularly restricted. For instance, from the viewpoint of ease of handling (handleability) and processability of the PSA sheet, ordinarily the thickness of the support substrate is appropriately about 2 μm or more, and preferably about 5 μm or more, for instance about 10 μm or more.

The surface of the support substrate may be subjected to a conventionally known surface treatment such as a corona discharge treatment, a plasma treatment, an ultraviolet irradiation treatment, an acid treatment, an alkali treatment, or application of a primer. Such a surface treatment may be a treatment for improving tight adhesiveness between the support substrate and the PSA layer, in other words, for improving the anchoring property of the PSA layer to the support substrate.

Release Liner

In the art disclosed herein a release liner can be used in the formation of the PSA layer, preparation of the PSA sheet, as well as in storage, distribution, processing and so forth of the PSA sheet before use. The release liner is not particularly limited, and examples thereof include a release liner having a release-treated layer on the surface of a liner substrate such as a resin film or paper, and a release liner made up of a low-adhesiveness material such as a fluoropolymer (polytetrafluoroethylene or the like) or a polyolefin resin (polyethylene, polypropylene or the like). The release-treated layer can be formed, for example, by surface-treating the liner substrate with a release treatment agent such as a silicone-based agent, long-chain alkyl-based agent, fluorine-based agent, or molybdenum sulfide.

PSA Sheet

The total thickness of the PSA sheet disclosed herein (including the PSA layer and further including a support substrate in a configuration having a support substrate, but not including a release liner) is not particularly limited. The total thickness of the PSA sheet can be, for example about 300 μm or less, and from the viewpoint of thickness reduction, ordinarily the thickness is appropriately about 200 μm or less is appropriate, and may be about 100 μm or less (for example about 70 μm or less). The lower limit of the thickness of the PSA sheet is not particularly restricted, and ordinarily the lower limit can be set to about 1 μm or more, and is appropriately for instance set to about 3 μm or more, and is preferably about 6 μm or more, more preferably about 10 μm or more (for instance about 15 μm or more). In a PSA sheet without substrate, the thickness of the PSA layer is the total thickness of the PSA sheet.

In a case where the art disclosed herein is embodied in the form of a double-sided PSA sheet without substrate, the thickness of the PSA sheet can be set to about 50 μm or less, and may for instance about 35 μm or less, or about 25 μm or less, and further, about 15 μm or less, or about 10 μm or less (for instance about 7 μm or less). The light shielding effect elicited by the art disclosed herein can be preferably brought out when such thin PSA sheet is used. The lower limit of the thickness of the double-sided PSA sheet without substrate can be set to about 1 μm or more, and from the viewpoint of adhesive characteristics such as adhesive strength, the lower limit is appropriately set to about 3 μm or more (for instance 5 μm or more), and is preferably about 8 μm or more, more preferably about 12 μm or more (for instance about 15 μm or more).

In the art disclosed herein a PSA layer of superior light-shielding properties is used, and hence a PSA sheet provided with the PSA layer can also exhibit superior light shielding. For instance, the total light transmittance of the PSA sheet can be lower than 10%. In a preferred embodiment, the total light transmittance of the PSA sheet is for instance lower than 5%, more preferably lower than 3%, yet more preferably lower than 1%, and particularly preferably lower than 0.5% (for instance lower than 0.1%). Superior light shielding is realized by a PSA sheet exhibiting the above total light transmittance. In a PSA sheet without substrate, superior light shielding can be preferably brought out in the vertical direction (thickness direction) and the horizontal direction (adhesive surface direction) of the PSA sheet. The lower limit of the total light transmittance is not particularly restricted, and may be substantially 0%, that is, at or below the detection limit. The total light transmittance of the PSA sheet can be measured in accordance with the method described in the examples below.

In a preferred embodiment, the PSA sheet has a thickness of 15 μm or less, and a total light transmittance lower than 10%. The art disclosed herein allows realizing superior light shielding, i.e. a total light transmittance lower than 10%, in a PSA sheet the thickness whereof is limited to 15 μm or less, as described above. The total light transmittance of a PSA sheet having a thickness of 15 μm or less is preferably lower than 8%, more preferably lower than 6%, yet more preferably lower than 3%, particularly preferably lower than 1%, and most preferably lower than 0.3% (for instance lower than 0.01%). The thickness of a PSA sheet having the above total light transmittance can be about 10 μm or less (for instance about 7 μm or less). The lower limit of the thickness of the PSA sheet in this embodiment is about 1 μm or more, and is appropriately set to about 3 μm or more, and from the viewpoint of adhesive characteristics such as adhesive strength, may be about 5 μm or more (for instance about 8 μm or more, and further, about 12 μm or more). A PSA sheet having the above thickness and total light transmittance can be typically in the form of a double-sided PSA sheet without substrate.

In another preferred embodiment, the PSA sheet has a thickness of 25 μm or less, and a total light transmittance lower than 3%. The art disclosed herein allows realizing superior light shielding, i.e. a total light transmittance lower than 3%, in a PSA layer the thickness whereof is limited to 25 μm or less, as described above. The total light transmittance of a PSA sheet having a thickness of 25 μm or less is preferably lower than 2%, more preferably lower than 1%, yet more preferably lower than 0.3%, particularly preferably lower than 0.03% and most preferably lower than 0.01%. The thickness of a PSA sheet having the above total light transmittance can be about 22 μm or less (for instance about 18 μm or less). The lower limit of the thickness of the PSA sheet in this embodiment is larger than 15 μm, and from the viewpoint of adhesive characteristics such as adhesive strength, may be about 20 μm or more (for instance about 23 μm or more). A PSA sheet having the above thickness and total light transmittance can be typically in the form of a double-sided PSA sheet without substrate.

In yet another preferred embodiment, the PSA sheet has a thickness of 35 μm or less, and a total light transmittance lower than 1%. The art disclosed herein allows realizing superior light shielding, i.e. a total light transmittance lower than 1%, in a PSA sheet the thickness whereof is limited to 35 μm or less, as described above. The total light transmittance of a PSA sheet having a thickness of 35 μm or less is preferably lower than 0.5%, more preferably lower than 0.2%, yet more preferably lower than 0.1%, particularly preferably lower than 0.03% and most preferably lower than 0.01%. The thickness of a PSA sheet having the above total light transmittance can be about 32 μm or less (for instance about 28 μm or less). The lower limit of the thickness of the PSA sheet in this embodiment is greater than 25 μm, and may be about 30 μm or more (for instance about 33 μm or more) from the viewpoint of adhesive characteristics such as adhesive strength. A PSA sheet having the above thickness and total light transmittance can be typically in the form of a double-sided PSA sheet without substrate.

In even yet another preferred embodiment, the PSA sheet has a thickness of 50 μm or less, and a total light transmittance lower than 0.5%. The art disclosed herein allows realizing superior light shielding, i.e. a total light transmittance lower than 0.5%, in a PSA sheet the thickness whereof is limited to 50 μm or less, as described above. The total light transmittance of a PSA sheet having a thickness of 50 μm or less is preferably lower than 0.1%, more preferably lower than 0.05%, yet more preferably lower than 0.02% and particularly preferably lower than 0.01%. The thickness of a PSA sheet having the above total light transmittance can be about 45 μm or less (for instance about 40 μm or less). The lower limit of the thickness of the PSA sheet in this embodiment is larger than 35 μm, and may be about 38 μm or more, or about 43 μm or more (for instance about 47 μm or more), from the viewpoint of adhesive characteristics such as adhesive strength. A PSA sheet having the above thickness and total light transmittance can be typically in the form of a double-sided PSA sheet without substrate.

The 180° peel strength of the PSA sheet disclosed herein can be about 3 N/25 mm or greater. The 180° peel strength is appropriately set to about 5 N/25 mm or more, from the viewpoint of achieving good adhesiveness towards an adherend. The art disclosed herein allows realizing a target light shielding through the use of a relatively small amount of carbon black particles, on the basis of the dispersion state of the carbon black particles in the PSA layer. That is, superior light shielding can be realized while preserving adhesive characteristics such as adhesive strength. Therefore, the 180° peel strength of the PSA sheet in the art disclosed herein is preferably about 7 N/25 mm or greater, more preferably about 8 N/25 mm or greater, yet more preferably about 10 N/25 mm or greater and particularly preferably about 12 N/25 mm or greater. The PSA sheet disclosed herein can bring out the above predetermined or higher adhesive strength while exhibiting a predetermined or higher light shielding (in other words a total light transmittance equal to or smaller than a predetermined value). The 180° peel strength can be measured in accordance with the method described in the examples below.

Applications

The PSA sheet disclosed herein is suitable for fixing members and imparting optical characteristics (typically imparting light-shielding properties) in for instance mobile electronic devices. Non-limiting examples of the mobile electronic devices include mobile phones, smart phones, tablet personal computers, laptop computers, various wearable devices (for example wrist-wearable devices such as wrist watches; modular devices worn on body parts with clips, straps or the like; eyewear-type devices encompassing eyeglass-type devices (of monocular and binocular type, including head-mounted devices); devices fitted to clothing, for example in the form of accessories on shirts, socks, hats or the like, and earwear-type devices attached to the ear, such as earphones), digital cameras, digital video cameras, audio devices (for instance mobile music players and IC recorders), calculators (for instance electronic calculators), mobile game machines, electronic dictionaries, electronic notebooks, e-book readers, information devices for automobiles, mobile radios, mobile televisions, mobile printers, mobile scanners and mobile modems. The term "mobile" in this description signifies not just enabling simple portability, but affording also a level of portability that allows the device to be carried by an individual (average adult) relatively easily.

The PSA sheet disclosed herein can be preferably used for instance for the purpose of fixing a pressure sensor and other members in a mobile electronic device provided with a pressure sensor, from among the mobile electronic devices exemplified above. In a preferred embodiment, the PSA sheet can be used for fixing a pressure sensor and other members in an electronic device (typically, a mobile electronic device) having a function of enabling the designation of an absolute position on a plate (typically, a touch panel) corresponding to the screen, in a device for instructing a position on a screen (typically, a pen-type or mouse-type device), and in a device for detecting a position on the screen.

The PSA sheet disclosed herein is also suitable for applications where the sheet is disposed on the back surface of a display screen (display unit) such as a touch panel display in a mobile electronic device, to thereby prevent reflection of light over the display screen. By arranging the PSA sheet disclosed herein on the back surface of the display screen (display unit) it becomes possible to prevent drops in visibility of the display screen, regardless of the manner in which the mobile electronic device is used. The above reflection can be caused by a metallic member disposed on the back-surface side of the display screen. Through the use however of the PSA sheet disclosed herein, for instance bonded to the metallic member and the display unit, it becomes possible to simultaneously bond the member and impart light shielding.

The material that makes up the object for fixing (for instance a back surface member of an electromagnetic wave shield or a reinforcing plate) such as the above pressure sensor or display unit is not particularly limited, and may be for instance a metallic material such as copper, silver, gold, iron, tin, palladium, aluminum, nickel, titanium, chromium or zinc, or an alloy including two or more of the foregoing; various resin materials (typically plastic materials) such as polyimide resins, acrylic resins, polyether nitrile resins, polyether sulfone resins, polyester resins (polyethylene terephthalate resins, polyethylene naphthalate resins and the like), polyvinyl chloride resins, polyphenylene sulfide resins, polyether ether ketone resins, polyamide resins (for instance so-called aramid resins), polyarylate resins, polycarbonate resins and liquid crystal polymers; and inorganic materials such as alumina, zirconia, soda glass, quartz glass and carbon. Widely used among the foregoing are metallic materials such as copper, aluminum and stainless steel, and resin materials (typically plastic materials) such as polyimide resins, aramid resins and polyphenylene sulfide resins. The object for fixing may have a single-layer structure or a multilayer structure, and the surface on which the PSA sheet is affixed (affixment surface) may be subjected to various surface treatment. Although not particularly limited thereto, examples of the object for fixing include a back surface member having a thickness of about 1 µm or more (typically 5 µm or more, for instance 60 µm or more, and further 120 µm or more), and 1500 µm or less (for instance 800 µm or less).

The PSA sheet disclosed herein boasts superior light shielding, and hence can be preferably used for instance in electronic devices (typically mobile electronic devices) from which a predetermined optical characteristic is requested. For instance, the PSA sheet can be used in electronic devices provided with a liquid crystal display device (and therefore, with a backlight module as a light source), and in electronic devices provided self-luminous elements, for instance organic ELs, for example for the purpose of preventing reflection and light leakage. In a concrete embodiment, the PSA sheet can be preferably used in a liquid crystal display device provided with a liquid crystal display module unit (LCD unit) and a backlight unit (BL unit) for bonding the LCD unit with the BL unit.

The PSA sheet disclosed herein can be used, in the form of a bonding member the outer shape whereof is worked in various ways, for instance for other bonding uses besides bonding the LCD unit and the BL unit. In a preferred embodiment of such a bonding member, the bonding member may have a narrow section having a width smaller than 2.0 mm (for instance smaller than 1.0 mm). The PSA sheet disclosed herein can exhibit superior light shielding in the vertical direction (thickness direction) and the horizontal direction (adhesive surface direction). Accordingly, the PSA sheet can deliver good performance also when used as a bonding member having a shape that encompasses such a narrow section (for instance a frame shape). In one embodiment, the width of the narrow section may be 0.7 mm or smaller, or 0.5 mm or smaller, and may be about 0.3 mm or smaller. The lower limit of the width of the narrow section is not particularly restricted, and ordinarily is appropriately 0.1 mm or greater (typically 0.2 mm or greater), from the viewpoint of ease of handling of the PSA sheet.

The narrow section is typically linear. Herein the term "linear" encompasses conceptually a straight-line shape, a curved shape, a bent-line shape (for example an L-shape), an annular shape such as a frame shape or circular shape, as well as composite and intermediate shapes of the foregoing. The term annular is not limited to a geometry made up of curves, and encompasses conceptually annular shapes such that part or the entirety thereof is formed as a straight line-shape, for instance the shape along the outer perimeter of a quadrangle (frame shape) or the shape along the outer perimeter of a fan shape. The length of the narrow section is not particularly limited. For instance, the effect achieved by resorting to the art disclosed herein can be suitably brought out in embodiments where the length of the narrow section is for instance 10 mm or larger (typically 20 mm or larger, for instance 30 mm or larger).

The PSA sheet disclosed herein can be preferably used having a shape such that a width W of the PSA layer in the narrow section is 50 times or less a thickness T of the PSA layer. Specifically, the PSA sheet can be preferably used, affixed to the adherend, so that the shape of the PSA sheet has a value of W/T of 50 or less (more preferably 40 or less, yet more preferably 30 or less, and for instance 25 or less). In a case for instance where, in an annular PSA sheet used for bonding the LCD unit and the BL unit of a liquid crystal display device, the PSA sheet has a PSA layer of high light transmittance, part of the light emitted by the BL unit is transmitted obliquely (towards the LCD unit) through the PSA layer, from the end of the inner periphery of the PSA layer on the BL unit side up to the end of the outer periphery of the PSA layer on the LCD unit side. Light having thus passed obliquely through the PSA layer towards the LDC unit is prone to giving rise to problems such as uneven luminance in the liquid crystal display surface. When the value of W/T is small, the proportion of light obliquely passing through the PSA layer towards the LDC unit, in the light transmitted through the PSA layer in the width direction, tends to increase. Therefore, this lends greater significance to preventing or suppressing leakage of light in the width direction of the PSA sheet, by resorting to the art disclosed herein.

The features disclosed in the description include the following.

(1) A PSA sheet comprising a PSA layer that includes a PSA polymer, wherein, the PSA layer includes carbon black particles in a dispersed state; and the carbon black particles dispersed in the PSA layer have an average particle size of 300 nm or smaller, wherein the average particle size is determined based on a number-based particle size distribution by TEM observation.

(2) The PSA sheet of (1), wherein the carbon black particles dispersed in the PSA layer have a standard deviation smaller than 200 nm in the number-based particle size distribution by TEM observation.

(3) The PSA sheet of (1) or (2), wherein the carbon black particles dispersed in the PSA layer have a particle size of 350 nm or more in an amount lower than 10%, in the number-based particle size distribution by TEM observation.

(4) The PSA sheet of any one of (1) to (3), wherein the PSA layer have a particle size of 100 nm or more and less than 150 nm in an amount of 15% or more in the number-based particle size distribution by TEM observation.

(5) The PSA sheet of any one of (1) to (4), wherein the PSA layer includes the carbon black particles in an amount of 0.1 to 30% by weight.

(6) The PSA sheet of any one of (1) to (5), wherein the PSA polymer is an acrylic polymer.

(7) The PSA sheet of any one of (1) to (6), wherein the PSA layer has a thickness of 1 to 100 μm.

(8) The PSA sheet of any one of (1) to (7), wherein the PSA sheet consists of the PSA layer.

(9) The PSA sheet of any one of (1) to (7), wherein the PSA sheet is a PSA sheet with substrate, comprising a substrate that supports the PSA layer.

(10) The PSA sheet of any one of (1) to (9), wherein the PSA sheet is used for fixing a member in a mobile electronic device.

(11) The PSA sheet of any one of (1) to (10), wherein the PSA layer has a thickness of 1 to 50 μm.

(12) The PSA sheet of any one of (1) to (11), wherein the PSA layer includes carbon black particles in an amount of 30% or less by weight.

(13) The PSA sheet of any one of (1) to (12), satisfying any one condition from among (A) to (D):

(A) the PSA layer has a thickness of 15 μm or less, and the PSA sheet has a total light transmittance lower than 10%;

(B) the PSA layer has a thickness of 25 μm or less, and the PSA sheet has a total light transmittance lower than 3%;

(C) the PSA layer has a thickness of 35 μm or less, and the PSA sheet has a total light transmittance lower than 1%; and (D) the PSA layer has a thickness of 50 μm or less, and the PSA sheet has a total light transmittance lower than 0.5%.

(14) The PSA sheet of any one of (1) to (13), wherein the PSA layer has a thickness of 15 μm or less, and the PSA sheet has a total light transmittance lower than 10%.

(15) The PSA sheet of any one of (1) to (13), wherein the PSA layer has a thickness of 25 μm or less, and the PSA sheet has a total light transmittance lower than 3%.

(16) The PSA sheet of any one of (1) to (13), wherein the PSA layer has a thickness of 35 μm or less, and the PSA sheet has a total light transmittance lower than 1%.

(17) The PSA sheet of any one of (1) to (13), wherein the PSA layer has a thickness of 50 μm or less, and the PSA sheet has a total light transmittance lower than 0.5%.

(18) The PSA sheet of any one of (1) to (17), wherein the PSA layer includes a tackifier resin.

(19) The PSA sheet of any one of (1) to (18), wherein a PSA composition for forming the PSA layer includes an isocyanate-based crosslinking agent and/or an epoxy-based crosslinking agent.

(20) The PSA sheet of any one of (1) to (19), having a 180° peel strength of 10 N/25 mm or greater to a stainless sheet.

EXAMPLES

Several examples pertaining to the present invention will be explained next, but the invention is not meant to be limited to such examples. Unless otherwise stated, the languages "parts" and "%" in the explanation below refer to a weight basis.

Evaluation Method
180° Peel Strength

In a measurement environment at 23° C. and 50% RH, one PSA surface of a double-sided PSA sheet was backed through affixing thereto of a polyethylene terephthalate (PET) film having a thickness of 50 μm, whereupon a measurement sample was produced through cutting into a size having a width of 25 mm wide and a length of 100 mm. The adhesive surface of the produced measurement sample was then press-bonded to the surface of a stainless steel sheet (SUS 304BA sheet), as a result of one back-and-forth roll of a 2 kg roller, in an environment at 23° C. and 50% RH. The resulting sample was allowed to stand for 30 minutes in the same environment, and thereafter the peel strength (N/25 mm) of the sample was measured using a universal tensile and compression tester, according to JIS Z 0237:2000, under conditions of tensile speed of 300 mm/minute, and peeling angle of 180°. For instance, "tensile compression tester TG-1kN" by Minebea Co., Ltd., or an equivalent device, is used herein as the universal tensile and compression tester. A single-sided PSA sheet requires herein no backing by the PET film.

Total Light Transmittance

Total light transmittance (%) is measured using a commercially available transmittance meter in accordance with JIS K 7136:2000. Herein product name "HAZE METER HM-150" by Murakami Color Research Laboratory, or an equivalent device, is used as the transmittance meter.

Measurement of Size of Carbon Black Particles in PSA Layer

A PSA sample is quick-frozen in a liquid nitrogen atmosphere, and is cut to a thickness of about 100 nm in a freezing atmosphere at −30° C., using an ultramicrotome (model "UC7" by Leica Microsystems GmbH), to prepare an ultrathin section. The obtained ultrathin slice is subjected to TEM observation using a transmission electron microscope (TEM; by Hitachi High-Technologies Corporation; acceleration voltage 100 kV). Image processing (binarization) is performed for one field of view (6 μm×6 μm square) of a TEM image magnified to approximately 3,000×, to identify particles, whereupon the area fractions of the particles are calculated for all the identified particles. An equivalent circle diameter is then calculated on the basis of the surface area of each particle. The term equivalent circle diameter denotes the diameter of a circle (true circle) having a surface area identical to the surface area of one particle to be measured. This operation is carried out with four different fields of view in the TEM image (N=4), and the particles classified in accordance at the equivalent circle diameter are plotted as a histogram referred to a number basis, to thereby determine a (number-basis) particle size distribution. The number serving as the calculation basis of the particle size distribution is obtained by counting the number of particles present within the above one field of view. An average particle size (nm) and a standard deviation (nm) are determined on the basis of the obtained particle size distribution. The analysis for identifying the particles is carried out excluding particles at the edges of the image. For instance, imageJ can be used as the image analysis software.

Measurement of Content of Carbon Black in PSA Layer

Herein about 8 to 10 mg of a PSA sample are subjected to thermogravimetry-differential thermal analysis (TG-DTA) under the conditions below.

Measurement Conditions
Device: "TG/DTA6200" by SII NanoTechnology Inc.
Atmosphere gas: nitrogen and air (200 mL/minute)
Container: platinum container
Temperature program: RT (room temperature)→holding (nitrogen) at 800° C.×1 hour→holding at 300° C.×15 minutes, after which supply gas is switched to air 1000° C.
Rate of temperature rise:10° C./minute Herein TG-DTA is carried out under the same conditions as described above, using the same PSA but in this case including no carbon black particles. Using then this PSA as a blank, the carbon black particles are quantified on the basis of the difference in measurement results with respect to the blank.

Materials Used

Carbon black dispersions A to C were prepared by adding carbon black particles and a dispersant to ethyl acetate, as a dispersion medium, so that the contents of the carbon black particles and dispersant were about 30% and about 1% to 5%, respectively. Various different species of dispersant from among those described in the description were used for the carbon black dispersions A to C (for instance a polyester resin for carbon black dispersion A, and a methacrylic resin for carbon black dispersion B). Herein "MULTILAC A903" (product name) by TOYOCOLOR Co., Ltd. was used as the carbon black dispersion D. A particle size distribution was measured, for each of the carbon black dispersions A to D, on the basis of a laser scattering/diffraction method (using product name "MICROTRAC MT3000II" by Microtrac-BEL Corp.; dispersion medium ethyl acetate), and there were recorded volume average particle size (nm), standard deviation (nm), cumulative 10% particle size (D10) (nm), cumulative 50% particle size (D50) (nm) and cumulative 90% particle size (D90) (nm). The measured values are given in Table 1. Herein D10, D50 and D90 denote particle sizes at which the cumulative volume, from the small particle size side, takes on a value of 10%, 50% and 90%, respectively, in a cumulative volume distribution with 100% as the total volume of the particle size distribution of the particles, determined on a volume basis.

TABLE 1

| Carbon black dispersion | A | B | C | D |
|---|---|---|---|---|
| Volume average particle size (nm) | 189 | 192 | 221 | 224 |
| Standard deviation (nm) | 80 | 79 | 96 | 88 |
| D10 (nm) | 99 | 97 | 108 | 114 |
| D50 (nm) | 174 | 166 | 197 | 201 |
| D90 (nm) | 303 | 316 | 361 | 347 |

Experiment 1

Example 1-1

Preparation of Acrylic Polymer

In a reaction vessel equipped with a stirrer, thermometer, nitrogen gas inlet tube, reflux condenser and addition funnel there were charged 95 parts of BA and 5 parts of AA as monomer components, and 233 parts of ethyl acetate as a polymerization solvent, with stirring for 2 hours while under introduction of nitrogen gas. After removal of oxygen from within the polymerization system, there were added 0.2 parts of 2,2'-azobisisobutyronitrile as a polymerization initiator, with solution polymerization being conducted for 8 hours at 60° C. to yield a solution of an acrylic polymer. The Mw of the acrylic polymer was about $70 \times 10^4$.

Preparation of PSA Composition

To this acrylic polymer solution there were added, relative to 100 parts of the acrylic polymer included in the solution, 0.8 parts of 1,2,3-benzotriazole (product name "BT-120" by Johoku Chemical Co., Ltd.), 20 parts of a terpene phenolic resin (product name "YS POLYSTER T-115", softening point about 115° C., hydroxyl value 30 to 60 mgKOH/g, by Yasuhara Chemical Co., Ltd.) as a tackifier resin, 3 parts of an isocyanate-based crosslinking agent (product name "CORONATE L", 75% ethyl acetate solution of a trimethylolpropane/tolylene isocyanate trimer adduct, by Tosoh Corporation), as a crosslinking agent, 0.01 parts of an epoxy-based crosslinking agent (product name "TETRAD-C", 1,3-bis(N,N-diglycidylaminomethyl)cyclohexane, by Mitsubishi Gas Chemical Company, Inc.), and the carbon black dispersion A, and the whole was mixed under stirring, to prepare a PSA composition. The carbon black dispersion A was added in an amount so that the solids concentration of the carbon black particles in the PSA layer was the content given in Table 2.

Production of PSA Sheet

The PSA composition was applied to the release surface of a polyester release liner (product name "DIAFOIL MRF" by Mitsubishi Polyester Film Inc.) having a thickness of 38 μm, with drying at 100° C. for 2 minutes, to form a PSA layer having a thickness of 15 μm. Then the release surface of a 25 μm thick polyester release liner (product name "DIAFOIL MRF", thickness of 25 μm, by Mitsubishi Polyester Film Inc.) was affixed to the PSA layer. A double-sided PSA sheet without substrate having a thickness of 15 μm and protected at each side with the two polyester release liners was thus prepared.

Example 1-2 to Example 1-4

Double-sided PSA sheets without substrate of the respective examples with the thicknesses described in Table 2 were prepared, otherwise in the same way as in Example 1-1.

Example 1-5 to Example 1-8

By using the carbon black dispersion B as the carbon black dispersion herein, double-sided PSA sheets without substrate of the respective examples with the thicknesses described in Table 2 were prepared, otherwise in the same manner as the preparation of Example 1-1.

Example 1-9 to Example 1-12

By using the carbon black dispersion C as the carbon black dispersion herein, double-sided PSA sheets without substrate of the respective examples with the thicknesses described in Table 2 were prepared, otherwise in the same manner as the preparation of Example 1-1.

Example 1-13 to Example 1-16

By using the carbon black dispersion D as the carbon black dispersion herein, double-sided PSA sheets without substrate of the respective examples with the thickness described in Table 2 were prepared, otherwise in the same manner as the preparation of Example 1-1.

The number-based carbon black particle size distributions by TEM observation were obtained for the PSAs that utilized the carbon black dispersion A (Example 1-1 to Example 1-4), the PSAs in which the carbon black dispersion B was used (Example 1-5 to Example 1-8), the PSAs in which the carbon black dispersion C was used (Example 1-9 to Example 1-12), and the PSAs in which the carbon black dispersion D was used (Example 1-13 to Example 1-16), and the average particle size (nm) and standard deviation (nm) of the carbon black particles were determined. Particle size distributions are illustrated in FIG. 3 to FIG. 6, and the average particle size (nm) and standard deviation (nm) are given in Table 2. With respect to the ranges of particle size in FIG. 3 to FIG. 6, for instance, "100 nm to 150 nm" refers to 100 nm or more and less than 150 nm. The same applies to other numerical value ranges of particle size in the figures. The total light transmittance (%) of the PSA sheets of the examples is given in Table 2. A 180° peel strength (N/25 mm) and amount of carbon black particles by TG-DTA were measured for the PSA sheets of Example 1-3, Example 1-7, Example 1-11 and Example 1-15. The results are given in Table 2.

TABLE 2

|  |  | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 | Ex. 1-10 | Ex. 1-11 | Ex. 1-12 | Ex. 1-13 | Ex. 1-14 | Ex. 1-15 | Ex. 1-16 |
|---|---|---|---|---|---|---|---|---|---|---|---|---|---|---|---|---|---|
| Carbon black | Dispersion | A | A | A | A | B | B | B | B | C | C | C | C | D | D | D | D |
|  | Average particle size (nm) | 130 | 130 | 130 | 130 | 80 | 80 | 80 | 80 | 240 | 240 | 240 | 240 | 340 | 340 | 340 | 340 |
|  | Standard deviation (nm) | 63 | 63 | 63 | 63 | 35 | 35 | 35 | 35 | 160 | 160 | 160 | 160 | 210 | 210 | 210 | 210 |
|  | Content (calculated value) (%) | | | | | | | | | 1.5 | | | | | | | |
|  | Content (TG-DTA) (%) | | 1.7 | | | | 1.8 | | | | 1.9 | | | | 1.3 | | |
| PSA layer thickness (μm) | | 15 | 25 | 35 | 50 | 15 | 25 | 35 | 50 | 15 | 25 | 35 | 50 | 15 | 25 | 35 | 50 |
| Total light transmittance (%) | | 4.77 | 1.00 | 0.15 | <0.01 | 6.59 | 2.05 | 0.17 | <0.01 | 10.66 | 3.13 | 1.02 | 0.19 | 17.28 | 7.66 | 2.44 | 0.56 |
| 180-degree peel strength (N/25 mm) | | | 13.4 | | | | 12.3 | | | | 12.8 | | | | 14.6 | | |

Experiment 2

Example 2-1

Without carbon black particles, a double-sided PSA sheet (thickness of 35 μm) without substrate according to the present example was prepared in the same way as in Example 1-3 of Experiment 1.

Example 2-2 to Example 2-4

By using carbon black particles with the amounts described in Table 3, double-sided PSA sheets (thickness of 35 μm) without substrate according to respective examples were prepared in the same way as in Example 1-7 of Experiment 1.

Example 2-5 to Example 2-7

By using carbon black particles with the amounts described in Table 3, double-sided PSA sheets (thickness of 35 μm) without substrate according to relative examples were prepared prepared in the same way as in Example 1-11 of Experiment 1.

The 180° peel strength (N/25 mm) and amount of carbon black particles by TG-DTA of the PSA sheets of the examples were measured. The results are given in Table 3.

TABLE 3

|  |  | Ex. 2-1 | Ex. 2-2 | Ex. 2-3 | Ex. 2-4 | Ex. 2-5 | Ex. 2-6 | Ex. 2-7 |
|---|---|---|---|---|---|---|---|---|
| Carbon black | Dispersion | — | B | B | B | C | C | C |
|  | Amount (%) | — | 1.6 | 5 | 20 | 1.6 | 5 | 20 |
|  | Content (TG-DTA) (%) | — | 1.5 | 5.1 | 18.3 | 1.2 | 4.8 | 15.0 |
| 180-degree peel strength (N/25 mm) | | 15.1 | 13.2 | 12.2 | 8.5 | 13.2 | 11.3 | 7.5 |

Experiment 3

Example 3-1 and Example 3-2

With the carbon black particle concentration (%) and PSA layer thickness (m) given in Table 4, double-sided PSA sheets without substrate according to respective examples were prepared in the same way as in Example 1-1 of Experiment 1.

The total light transmittance (%) of the obtained PSA sheets was measured. The results are given in Table 4.

TABLE 4

|  |  | Ex. 3-1 | Ex. 3-2 |
|---|---|---|---|
| Carbon black | Dispersion | A | A |
|  | Amount (%) | 10 | 5 |
| PSA layer thickness (μm) | | 5 | 15 |
| Total light transmittance (%) | | 0.06 | <0.01 |

As Table 1 reveals, the volume average particle size in ethyl acetate of the carbon black dispersions A to D was about 200 nm, and no significant differences in particle size characteristic could be observed, either in terms of standard deviation (about 90 nm) or cumulative frequency. When the carbon black particles included in the carbon black dispersions were blended into PSA layers, however, the particles exhibited different particle size distributions, average particle sizes and standard deviations, as given in Table 2 and illustrated in FIG. 3 to FIG. 6. In Example 1-1 to Example 1-12, where average particle size of the carbon black particles dispersed in the PSA layer was 300 nm or less, a significantly lower total light transmittance was determined, for a corresponding PSA layer thickness, as compared with Example 1-13 to Example 1-16, where the average particle size exceeded 300 nm. In all these examples (Example 1-1 to Example 1-12) the standard deviation of the carbon black particle distribution in the PSA layers was smaller than 200 nm.

Figure 3:
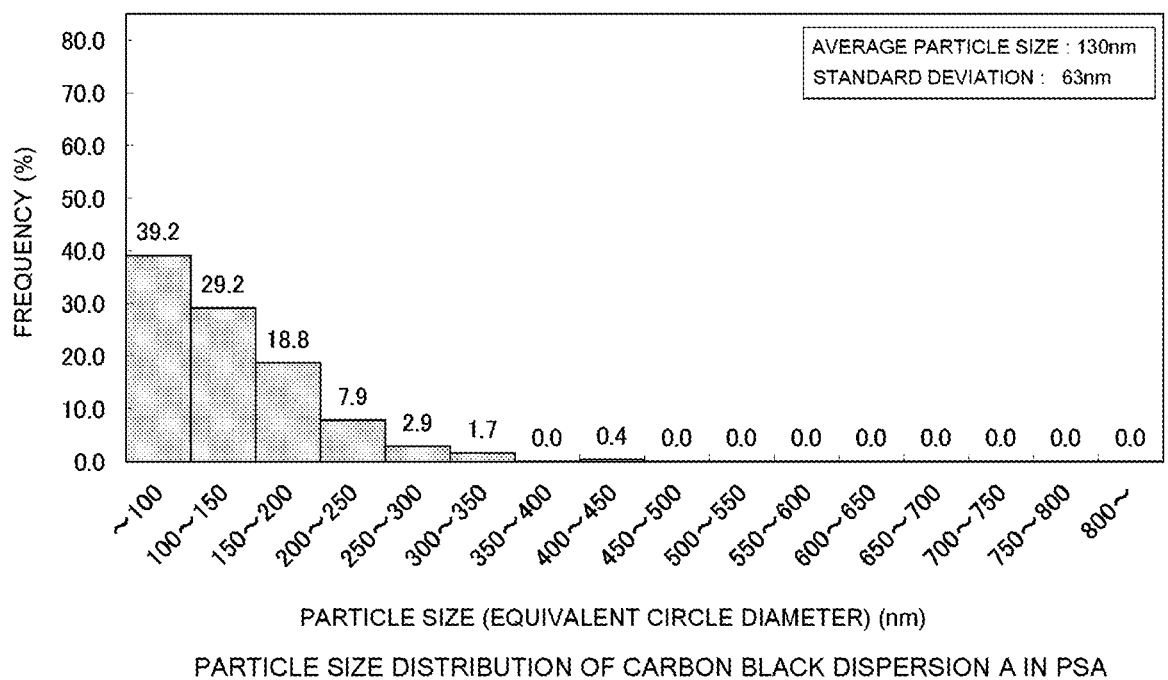
FIG. 3 is a histogram representing a number-based particle size distribution, by TEM observation, of a PSA in which a carbon black dispersion A is used.
Figure 4:
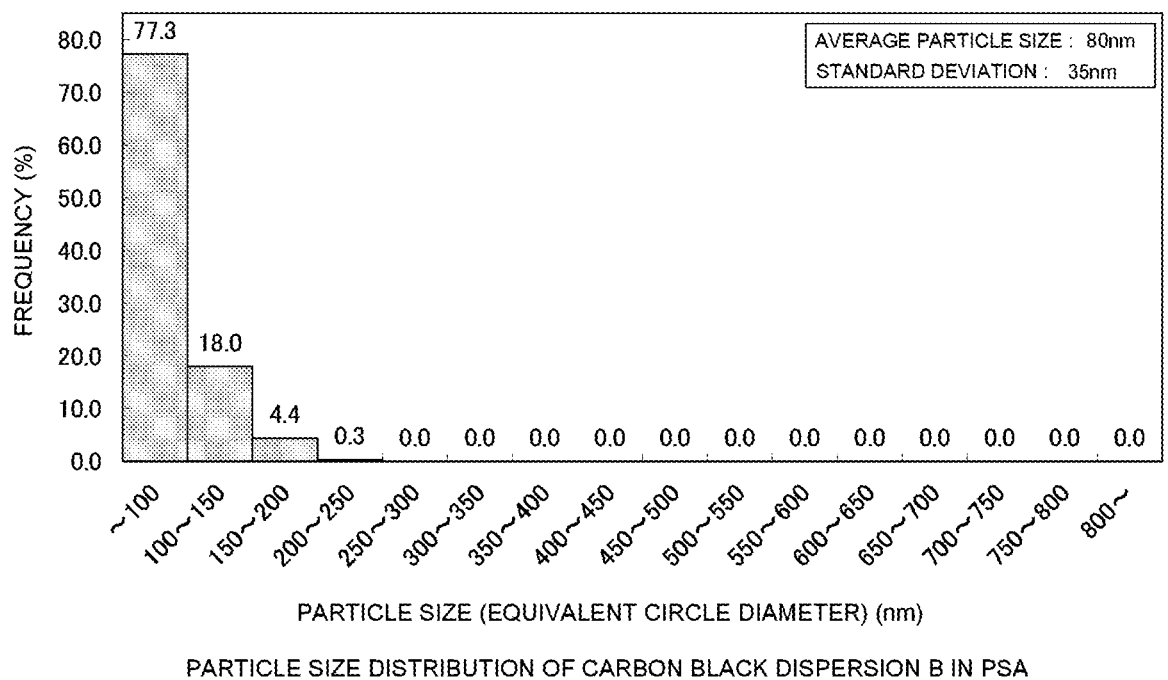
FIG. 4 is a histogram representing a number-based particle size distribution, by TEM observation, of a PSA in which a carbon black dispersion B is used.
Figure 5:
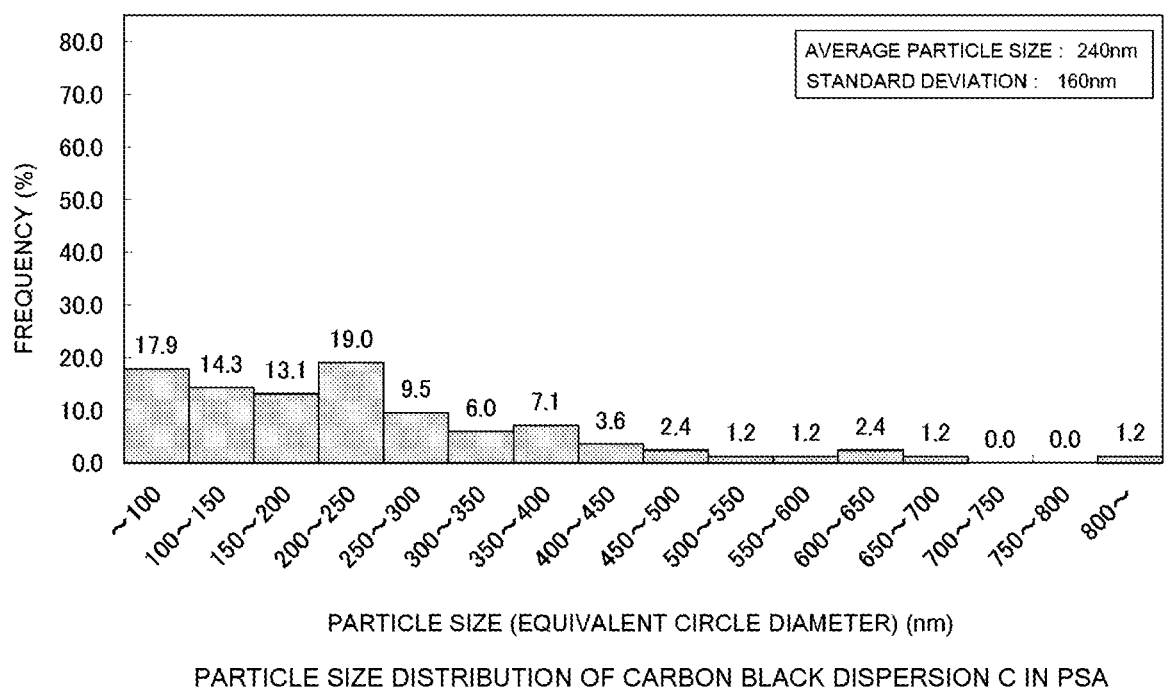
FIG. 5 is a histogram representing a number-based particle size distribution, by TEM observation, of a PSA in which a carbon black dispersion C is used.
Figure 6:
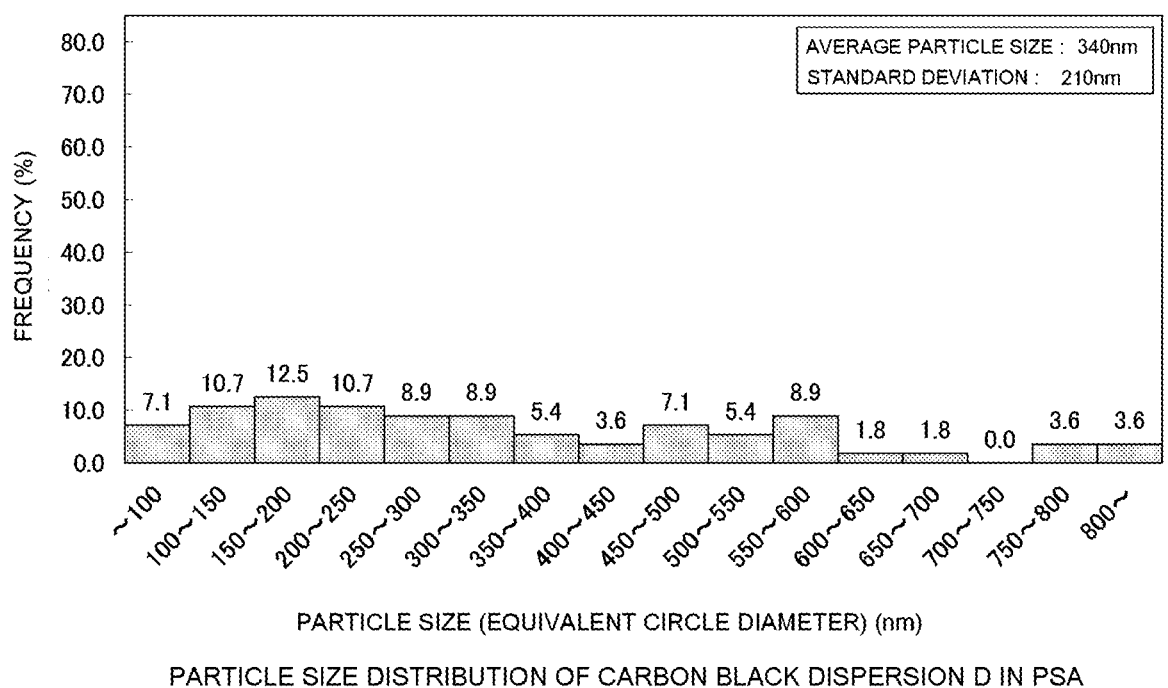
FIG. 6 is a histogram representing a number-based particle size distribution, by TEM observation, of a PSA in which a carbon black dispersion D is used.

Total light transmittance in Example 1-1 to Example 1-8 was lower than in Example 1-9 to Example 1-12. In these examples (Example 1-1 to Example 1-8) the proportion of particles having a particle size of 350 nm or more in the carbon black particle distribution in the PSA layers was lower than 10%, as illustrated in FIG. 3 and FIG. 4. In the examples, the proportion of particles having a particle size of 100 nm or more and less than 150 nm, in the particle size distribution, was 15% or more. Differences in transmittance derived from differences in the carbon black dispersions that are used are well understood in a comparison of embodiments where a thin PSA layer (thickness of 15 μm) is formed (Example 1-1, Example 1-5, Example 1-9 and Example 1-13).

In an embodiment where the thickness of the PSA layer was 35 μm, as shown in Table 2, the 180° peel strength was recorded as 12 N/25 mm or greater, regardless of the species of the carbon black dispersion. As Table 3 shows, it was found that the 180° peel strength tended to decrease with increasing amount of the carbon black particles.

In Experiment 1 there was evaluated the total light transmittance of a thin PSA layer, using the carbon black dispersion A that afforded the best effect of lowering total light transmittance. It was found that total light transmittance could be made lower than 0.1% by setting the concentration of carbon black particles to 10%, also for a thickness of 5 μm, as shown in Table 4. In an embodiment with a thickness of 15 μm, the total light transmittance was lower than 0.01%, for a carbon black particle concentration of 5%.

These results indicate that a PSA sheet is provided with a PSA layer exhibiting superior light shielding can be obtained by setting the average particle size of the carbon black particles dispersed in the PSA layer to 300 nm or less. The results reveal that yet superior light shielding can be realized by prescribing the standard deviation of the particle size distribution of the carbon black particles dispersed in the PSA layer to be smaller than 200 nm, and/or prescribing the proportion of particles having a particle size of 350 nm or more in the particle size distribution to be lower than 10%, and/or prescribing the proportion of particles having a particle size of 100 nm or more and less than 150 nm in the particle size distribution to be 15% or more.

Concrete examples of the present invention have been explained in detail above, but the examples are merely illustrative in nature, and are not meant to limit the scope of the claims in any way. The art set forth in the claims encompasses various alterations and modifications of the concrete examples illustrated above.

What is claimed is:

1. A liquid crystal display having a liquid crystal display module unit, a backlight module unit, and an adhesively double-faced pressure-sensitive adhesive sheet joining the liquid crystal display module unit and the backlight module unit,
wherein
the adhesively double-faced pressure-sensitive adhesive sheet consists of a pressure-sensitive adhesive layer that includes a pressure-sensitive adhesive polymer,
the pressure-sensitive adhesive layer includes carbon black particles in a dispersed state, and
the carbon black particles dispersed in the pressure-sensitive adhesive layer have an average particle size of 300 nm or smaller, wherein the average particle size is determined based on a number-based particle size distribution by TEM observation.

2. The liquid crystal display according to claim 1, wherein the carbon black particles dispersed in the pressure-sensitive adhesive layer have a standard deviation smaller than 200 nm in the number-based particle size distribution by TEM observation.

3. The liquid crystal display according to claim 1, wherein the carbon black particles dispersed in the pressure-sensitive adhesive layer have a particle size of 350 nm or greater in an amount lower than 10% in the number-based particle size distribution by TEM observation.

4. The liquid crystal display according to claim 1, wherein the carbon black particles dispersed in the pressure-sensitive adhesive layer have a particle size of 100 nm or greater and smaller than 150 nm in an amount of 15% or higher in the number-based particle size distribution by TEM observation.

5. The liquid crystal display according to claim 1, wherein the pressure-sensitive adhesive layer includes the carbon black particles in an amount of 0.1% to 30% by weight.

6. The liquid crystal display according to claim 1, wherein the pressure-sensitive adhesive polymer is an acrylic polymer.

7. The liquid crystal display according to claim 1, wherein the pressure-sensitive adhesive layer has a thickness of 1 μm to 100 μM.

8. A pressure-sensitive adhesive sheet consists of a pressure-sensitive adhesive layer that includes a pressure-sensitive adhesive polymer, wherein,
the pressure-sensitive adhesive layer includes carbon black particles in a dispersed state, and
the carbon black particles dispersed in the pressure-sensitive adhesive layer have an average particle size of 300 nm or smaller, wherein the average particle size is determined based on a number-based particle size distribution by TEM observation.

9. The pressure-sensitive adhesive sheet according to claim 8, wherein the carbon black particles dispersed in the pressure-sensitive adhesive layer have a standard deviation smaller than 200 nm in the number-based particle size distribution by TEM observation.

10. The pressure-sensitive adhesive sheet according to claim 8, wherein the carbon black particles dispersed in the pressure-sensitive adhesive layer have a particle size of 350 nm or greater in an amount lower than 10% in the number-based particle size distribution by TEM observation.

11. The pressure-sensitive adhesive sheet according to claim 8, wherein the carbon black particles dispersed in the pressure-sensitive adhesive layer have a particle size of 100 nm or greater and smaller than 150 nm in an amount of 15% or higher in the number-based particle size distribution by TEM observation.

12. The pressure-sensitive adhesive sheet according to claim 8, wherein the pressure-sensitive adhesive layer includes the carbon black particles in an amount of 0.1% to 30% by weight.

13. The pressure-sensitive adhesive sheet according to claim 8, wherein the pressure-sensitive adhesive polymer is an acrylic polymer.

14. The pressure-sensitive adhesive sheet according to claim 8, wherein the pressure-sensitive adhesive layer has a thickness of 1 μm to 100 μm.

15. The pressure-sensitive adhesive sheet according to claim 8, wherein the pressure-sensitive adhesive sheet is used for fixing a member in a mobile electronic device.

16. A pressure-sensitive adhesive sheet with release liner comprising:
the pressure-sensitive adhesive sheet according to claim 8; and
a release liner protecting a surface of the pressure-sensitive adhesive layer.

17. The pressure-sensitive adhesive sheet according to claim 8, wherein the pressure-sensitive adhesive layer has a thickness of 25 μm or less.

18. The pressure-sensitive adhesive sheet according to claim 8, wherein the carbon black particles have a volume average particle size of 10 nm or more and 500 nm or less.

19. The pressure-sensitive adhesive sheet according to claim 8, wherein the carbon black particles have a volume average particle size of 10 nm or more and 500 nm or less, and the carbon black particles dispersed in the pressure-sensitive adhesive layer have the average particle size of 240 nm or smaller, wherein the average particle size is determined based on a number-based particle size distribution by TEM observation.

20. A pressure-sensitive adhesive sheet with release liner consisting of:

the pressure-sensitive adhesive sheet according to claim 8; and a release liner protecting a surface of the pressure-sensitive adhesive layer.

* * * * *